US008426505B2

(12) United States Patent
Yoshida

(10) Patent No.: US 8,426,505 B2
(45) Date of Patent: *Apr. 23, 2013

(54) RESIN COMPOSITION FOR LASER ENGRAVING, RELIEF PRINTING STARTING PLATE FOR LASER ENGRAVING, PROCESS FOR MAKING RELIEF PRINTING PLATE, AND RELIEF PRINTING PLATE

(75) Inventor: Kenta Yoshida, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/977,925

(22) Filed: Dec. 23, 2010

(65) Prior Publication Data

US 2011/0156317 A1 Jun. 30, 2011

(30) Foreign Application Priority Data

Dec. 25, 2009 (JP) ................................ 2009-296123

(51) Int. Cl.

| | |
|---|---|
| ***C08K 5/24*** | (2006.01) |
| ***B05D 3/06*** | (2006.01) |
| ***B29C 35/08*** | (2006.01) |
| ***G03C 1/00*** | (2006.01) |

(52) U.S. Cl.

USPC ..... 524/265; 524/261; 430/270.1; 430/281.1; 430/286.1; 264/400; 264/409; 522/2

(58) Field of Classification Search .................. 428/156; 522/2; 264/400, 499; 430/270.1, 281.1, 430/286.1; 524/261, 265, 543, 547

See application file for complete search history.

(56) References Cited

U.S. PATENT DOCUMENTS

| | | | | |
|---|---|---|---|---|
| 5,002,857 | A * | 3/1991 | Toyama et al. | 430/300 |
| 7,029,825 | B2 * | 4/2006 | Yokota et al. | 430/281.1 |
| 7,901,863 | B2 * | 3/2011 | Yamada et al. | 430/270.1 |
| 2002/0010271 | A1 * | 1/2002 | Toui et al. | 525/100 |
| 2006/0257783 | A1 * | 11/2006 | Sugasaki | 430/270.1 |
| 2009/0246469 | A1 * | 10/2009 | Kawashima et al. | 428/156 |
| 2011/0076454 | A1 * | 3/2011 | Hitomi et al. | 428/156 |
| 2011/0293897 | A1 * | 12/2011 | Kawashima | 428/195.1 |
| 2011/0311776 | A1 * | 12/2011 | Sugasaki et al. | 428/156 |
| 2011/0318537 | A1 * | 12/2011 | Yoshida | 428/156 |
| 2011/0319563 | A1 * | 12/2011 | Yamashita | 525/61 |

FOREIGN PATENT DOCUMENTS

| | | | |
|---|---|---|---|
| JP | 11-338139 | A | 12/1999 |
| JP | 2004-174758 | A | 6/2004 |
| WO | 2005/070691 | A | 8/2005 |

OTHER PUBLICATIONS

"Masterworks Fine Art." http://www.masterworksfineart.com/out/printmaking.php, 2012.*

* cited by examiner

*Primary Examiner* — Hannah Pak

(74) *Attorney, Agent, or Firm* — Sughrue Mion, PLLC

(57) ABSTRACT

A process for making a relief printing plate is provided that includes (1) a step of crosslinking by means of heat and/or light a relief-forming layer formed from a resin composition containing (Component A) a compound having a hydrolyzable silyl group and/or a silanol group, (Component B) a thermoplastic elastomer, and (Component C) a polymerizable compound, and (2) a step of forming a relief layer by laser-engraving the crosslinked relief-forming layer.

16 Claims, No Drawings

RESIN COMPOSITION FOR LASER ENGRAVING, RELIEF PRINTING STARTING PLATE FOR LASER ENGRAVING, PROCESS FOR MAKING RELIEF PRINTING PLATE, AND RELIEF PRINTING PLATE

BACKGROUND OF THE INVENTION

1. Field of the Invention

The present invention relates to a resin composition for laser engraving, a relief printing starting plate for laser engraving, a process for making a relief printing plate, and a relief printing plate.

2. Background Art

Conventionally, a hydrophobic laser engraving type printing plate employing natural rubber, synthetic rubber, a thermoplastic elastomer, etc. is used (ref. JP-A-11-338139, etc. (JP-A denotes a Japanese unexamined patent application publication)). As a technique for improving the rinsing properties of engraving residue generated by laser engraving, a technique in which porous inorganic fine particles are contained in a relief-forming layer, and liquid residue is adsorbed on these particles, thus improving removability has been proposed (ref. e.g. JP-A-2004-174758). Furthermore, it has been shown that an organic silicon compound contained in a laser-engravable photosensitive resin composition reduces the percentage residue remaining after engraving (making it difficult for residue to be attached), and engraving residue can easily be wiped away by a cloth impregnated with an organic solvent (ref. International Patent Application WO 2005-070691).

DESCRIPTION OF THE RELATED ART

Problems to be Solved by the Invention

The method described in JP-A-2004-174758 has the problem that, due to particles being contained, an engraved shape (edge shape) is not satisfactory, and degradation of image quality is caused.

Furthermore, in the method described in International Patent Application WO 2005-070691, tacky residue is removed using an organic solvent, and it is difficult to remove tacky residue using an aqueous system, which is excellent in terms of environment suitability.

It is an object of the present invention to provide a resin composition for laser engraving that can give a relief printing plate having excellent hardness, film elasticity, printing durability, and aqueous ink transfer properties and that has excellent rinsing properties for engraving residue generated when laser-engraving a printing plate and excellent engraving sensitivity in laser engraving, a relief printing starting plate employing the resin composition for laser engraving, a process for making a relief printing plate employing same, and a relief printing plate obtained thereby.

Means For Solving The Problems

The above-mentioned object of the present invention has been achieved by means described in <1> to <18> below.

<1> A resin composition for laser engraving comprising (Component A) a compound having a hydrolyzable silyl group and/or a silanol group, (Component B) a thermoplastic elastomer, and (Component C) a polymerizable compound, <2> the resin composition for laser engraving according to <1> above, wherein Component A above is a compound having a total of two or more of a hydrolyzable silyl group and a silanol group, <3> the resin composition for laser engraving according to <1> or <2> above, wherein the hydrolyzable silyl group of Component A above is a residue in which at least one alkoxy group or halogen atom is directly bonded to the Si atom, <4> the resin composition for laser engraving according to any one of <1> to <3> above, wherein Component A above has a hydrolysable silyl group and/or a silanol group only as a polymerizable group, <5> the resin composition for laser engraving according to any one of <1> to <4> above, wherein Component B above is a thermoplastic elastomer selected from the group consisting of a styrene-based thermoplastic elastomer, an polyester-based thermoplastic elastomer, an polyamide-based thermoplastic elastomer, an olefin-based thermoplastic elastomer, and an ethylene-(meth)acrylate ester-based thermoplastic elastomer, <6> the resin composition for laser engraving according to any one of <1> to <5> above, wherein Component B above is a styrene-based thermoplastic elastomer or an ethylene-(meth)acrylate ester-based thermoplastic elastomer, <7> the resin composition for laser engraving according to any one of <1> to <6> above, wherein it further comprises (Component D) an alcohol exchange reaction catalyst, <8> the resin composition for laser engraving according to any one of <1> to <7> above, wherein it further comprises (Component E) a polymerization initiator, <9> the resin composition for laser engraving according to any one of <1> to <8> above, wherein it further comprises (Component F) a photothermal conversion agent that can absorb light having a wavelength of 700 to 1,300 nm, <10> a relief printing starting plate for laser engraving comprising above a support a relief-forming layer formed from the resin composition for laser engraving according to any one of <1> to <9> above, <11> the relief printing starting plate for laser engraving according to <10> above, wherein the relief-forming layer is crosslinked by means of heat and/or light, <12> the relief printing starting plate for laser engraving according to <10> or <11> above, wherein the relief-forming layer is crosslinked by means of heat, <13> a process for making a relief printing plate, comprising (1) a step of crosslinking the relief-forming layer of the relief printing starting plate for laser engraving according to <10> above by means of heat and/or light and (2) a step of forming a relief layer by laser-engraving the crosslinked relief-forming layer, <14> the process for making a relief printing plate according to <13> above, wherein step (1) above is a step of crosslinking the relief-forming layer by means of heat, <15> the process for making a relief printing plate according to <13> or <14> above, wherein it further comprises (3) a rinsing step of rinsing an engraved relief layer surface with an aqueous rinsing liquid, <16> a relief printing plate comprising a relief layer produced by the process for making a relief printing plate according to any one of <13> to <15> above, <17> the relief printing plate according to <16> above, wherein the relief layer has a thickness of at least 0.05 mm but no greater than 10 mm, and <18> the relief printing plate according to <16> or <17> above, wherein the relief layer has a Shore A hardness of at least 50° but no greater than 90°.

EFFECTS OF THE INVENTION

In accordance with the present invention, there can be provided a resin composition for laser engraving that can give a relief printing plate having excellent hardness, film elasticity, printing durability, and aqueous ink transfer properties and that has excellent rinsing properties for engraving residue generated when laser-engraving a printing plate and excellent engraving sensitivity in laser engraving, a relief printing starting plate, a process for making a relief printing plate employing same, and a relief printing plate.

DETAILED DESCRIPTION OF THE INVENTION

Resin Composition for Laser Engraving

The resin composition for laser engraving of the present invention (hereinafter, also called a 'resin composition') comprises (Component A) a compound having a hydrolyzable silyl group and/or a silanol group, (Component B) a thermoplastic elastomer, and (Component C) a polymerizable compound. In the present specification, 'A to B', which expresses a numerical range, has the same meaning as 'at least A but no greater than B'.

Since the resin composition of the present invention has high engraving sensitivity when applied to laser engraving and excellent rinsing properties for engraving residue, the time taken for forming a relief layer and making a plate can be reduced. The resin composition of the present invention having such characteristics may be used without any particular limitation in a wide range of other applications in addition to a relief-forming layer of a relief printing starting plate that is subjected to laser engraving. It may be used in formation of another product in which asperities or apertures are formed on the surface, for example, various types of printing plates or various types of moldings in which an image is formed by laser engraving, such as an intaglio plate, a stencil plate, or a stamp. Among them, a preferred embodiment is use in formation of a relief-forming layer provided on an appropriate support.

In the present specification, when a relief printing starting plater is explained, a layer that comprises the binder polymer (Component B), that serves as an image-forming layer subjected to laser engraving, that has a flat surface, and that is an uncrosslinked crosslinkable layer is called a relief-forming layer, a layer that is formed by crosslinking the relief-forming layer is called a crosslinked relief-forming layer, and a layer that has asperities formed on the surface by laser engraving the crosslinked relief-forming layer is called a relief layer.

Constituent components of the resin composition for laser engraving are explained below.

(Component A) Compound having Hydrolyzable Silyl Group and/or Silanol Group

The 'hydrolyzable silyl group' of (Component A) a compound having a hydrolyzable silyl group and/or a silanol group (hereinafter, called 'Component A' as appropriate) used in the resin composition for laser engraving of the present invention is a silyl group that is hydrolyzable; examples of hydrolyzable groups include an alkoxy group, a mercapto group, a halogen atom, an amide group, an acetoxy group, an amino group, and an isopropenoxy group. A silyl group is hydrolyzed to become a silanol group, and a silanol group undergoes dehydration-condensation to form a siloxane bond. Such a hydrolyzable silyl group or silanol group is preferably one represented by Formula (1) below.

(1)

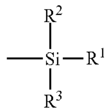

In Formula (1) above, at least one of $R^1$ to $R^3$ denotes a hydrolyzable group selected from the group consisting of an alkoxy group, a mercapto group, a halogen atom, an amide group, an acetoxy group, an amino group, and an isopropenoxy group, or a hydroxy group. The remainder of $R^1$ to $R^3$ independently denote a hydrogen atom, a halogen atom, or a monovalent organic substituent (examples including an alkyl group, an aryl group, an alkenyl group, an alkynyl group, and an aralkyl group).

In Formula (1) above, the hydrolyzable group bonded to the silicon atom is particularly preferably an alkoxy group or a halogen atom, and more preferably an alkoxy group.

From the viewpoint of rinsing properties and printing durability, the alkoxy group is preferably an alkoxy group having 1 to 30 carbon atoms, more preferably an alkoxy group having 1 to 15 carbon atoms, yet more preferably an alkoxy group having 1 to 5 carbon atoms, particularly preferably an alkoxy group having 1 to 3 carbon atoms, and most preferably a methoxy group or an ethoxy group.

Furthermore, examples of the halogen atom include an F atom, a Cl atom, a Br atom, and an I atom, and from the viewpoint of ease of synthesis and stability it is preferably a Cl atom or a Br atom, and more preferably a Cl atom.

Component A in the present invention is preferably a compound having one or more groups represented by Formula (1) above, and more preferably a compound having two or more. A compound having two or more hydrolyzable silyl groups is particularly preferably used. That is, a compound having in the molecule two or more silicon atoms having a hydrolyzable group bonded thereto is preferably used. The number of silicon atoms having a hydrolyzable group bond thereto contained in Component A is preferably at least 2 but no greater than 6, and most preferably 2 or 3.

A range of 1 to 4 of the hydrolyzable groups may bond to one silicon atom, and the total number of hydrolyzable groups in Formula (1) is preferably in a range of 2 or 3. It is particularly preferable that three hydrolyzable groups are bonded to a silicon atom. When two or more hydrolyzable groups are bonded to a silicon atom, they may be identical to or different from each other.

Specific preferred examples of the alkoxy group as the above hydrolyzable groups include a methoxy group, an ethoxy group, a propoxy group, an isopropoxy group, a butoxy group, a tert-butoxy group, a phenoxy group, and a benzyloxy group. A plurality of each of these alkoxy groups may be used in combination, or a plurality of different alkoxy groups may be used in combination.

Examples of the alkoxysilyl group having an alkoxy group bonded thereto include a trialkoxysilyl group such as a trimethoxysilyl group, a triethoxysilyl group, a triisopropoxysilyl group, or a triphenoxysilyl group; a dialkoxymonoalkylsilyl group such as a dimethoxymethylsilyl group or a diethoxymethylsilyl group; and a monoalkoxydialkylsilyl group such as a methoxydimethylsilyl group or an ethoxydimethylsilyl group.

Component A preferably has at least a sulfur atom, an ester bond, a urethane bond, an ether bond, a urea bond, or an imino group.

Among them, from the viewpoint of crosslinkability, Component A preferably comprises a sulfur atom, and from the viewpoint of removability (rinsing properties) of engraving residue it is preferable for it to comprise an ester bond, a urethane bond, or an ether bond (in particular, an ether bond contained in an oxyalkylene group), which are easily decomposed by aqueous alkali. There are cases in which a Component A containing a sulfur atom functions as a vulcanizing agent or a vulcanization accelerator when carrying out a vulcanization treatment, thus promoting a reaction (crosslinking) of Component B, and as a result, the strength of a crosslinked relief-forming layer and a relief layer is improved.

Furthermore, Component A in the present invention is preferably a compound that does not have an ethylenically unsaturated bond. Component A above preferably has a hydrolysable silyl group and/or a silanol group only as a polymerizable group.

As Component A in the present invention, there can be cited a compound in which a plurality of groups represented by Formula (1) above are bonded via a divalent linking group, and from the viewpoint of the effect, such a divalent linking group is preferably a linking group having a sulfide group (—S—), an imino group (—N(R)—) or a urethane bond (—OCON(R)— or —N(R)COO—). R denotes a hydrogen atom or a substituent. Examples of the substituent denoted by R include an alkyl group, an aryl group, an alkenyl group, an alkynyl group, and an aralkyl group.

A method for synthesizing Component A is not particularly limited, and synthesis can be carried out by a known method. As one example, a representative synthetic method for a Component A containing a linking group having the above-mentioned specific structure is shown below.

<Synthetic Method for Compound having Sulfide Group as Linking Group and having Hydrolyzable Silyl Group and/or Silanol Group>

A synthetic method for a Component A having a sulfide group as a linking group (hereinafter, called as appropriate a ‘sulfide linking group-containing Component A’) is not particularly limited, but specific examples thereof include reaction of a Component A having a halogenated hydrocarbon group with an alkali metal sulfide, reaction of a Component A having a mercapto group with a halogenated hydrocarbon, reaction of a Component A having a mercapto group with a Component A having a halogenated hydrocarbon group, reaction of a Component A having a halogenated hydrocarbon group with a mercaptan, reaction of a Component A having an ethylenically unsaturated double bond with a mercaptan, reaction of a Component A having an ethylenically unsaturated double bond with a Component A having a mercapto group, reaction of a compound having an ethylenically unsaturated double bond with a Component A having a mercapto group, reaction of a ketone with a Component A having a mercapto group, reaction of a diazonium salt with a Component A having a mercapto group, reaction of a Component A having a mercapto group with an oxirane, reaction of a Component A having a mercapto group with a Component A having an oxirane group, reaction of a mercaptan with a Component A having an oxirane group, and reaction of a Component A having a mercapto group with an aziridine.

<Synthetic Method for Compound having Imino Group as Linking Group and having Hydrolyzable Silyl Group and/or Silanol Group>

A synthetic method for a Component A having an imino group as a linking group (hereinafter, called as appropriate an ‘imino linking group-containing Component A’) is not particularly limited, but specific examples include reaction of a Component A having an amino group with a halogenated hydrocarbon, reaction of a Component A having an amino group with a Component A having a halogenated hydrocarbon group, reaction of a Component A having a halogenated hydrocarbon group with an amine, reaction of a Component A having an amino group with an oxirane, reaction of a Component A having an amino group with a Component A having an oxirane group, reaction of an amine with a Component A having an oxirane group, reaction of a Component A having an amino group with an aziridine, reaction of a Component A having an ethylenically unsaturated bond with an amine, reaction of a Component A having an ethylenically unsaturated bond with a Component A having an amino group, reaction of a compound having an ethylenically unsaturated bond with a Component A having an amino group, reaction of a compound having an acetylenically unsaturated bond with a Component A having an amino group, reaction of a Component A having an imine-based unsaturated double bond with an organic alkali metal compound, reaction of a Component A having an imine-based unsaturated bond with an organic alkaline earth metal compound, and reaction of a carbonyl compound with a Component A having an amino group.

Synthetic Method for Compound having Urea Bond (Ureylene Group) as Linking Group and having Hydrolyzable Silyl Group and/or Silanol Group A synthetic method for Component A having an ureylene group (hereinafter, called as appropriate a ‘ureylene linking group-containing Component A’) as a linking group is not particularly limited, but specific examples include synthetic methods such as reaction of a Component A having an amino group with an isocyanate ester, reaction of a Component A having an amino group with a Component A having an isocyanate ester, and reaction of an amine with a Component A having an isocyanate ester.

Component A is preferably a compound represented by Formula (A-1) or Formula (A-2) below.

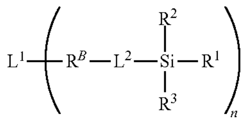

(A-1)

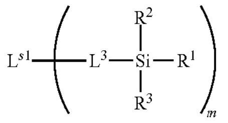

(A-2)

(In Formula (A-1) and Formula (A-2), $R^B$ denotes an ester bond, an amide bond, a urethane bond, a urea bond, or an imino group, $L^1$ denotes an n-valent linking group, $L^2$ denotes a divalent linking group, $L^{s1}$ denotes an m-valent linking group, $L^3$ denotes a divalent linking group, n and m independently denote an integer of 1 or greater, and $R^1$ to $R^3$ independently denote a hydrogen atom, a halogen atom, or a monovalent organic substituent. In addition, at least one of $R^1$ to $R^3$ denotes a hydrolyzable group selected from the group consisting of an alkoxy group, a mercapto group, a halogen atom, an amide group, an acetoxy group, an amino group, and an isopropenoxy group, or a hydroxy group.)

$R^1$ to $R^3$ in Formula (A-1) and Formula (A-2) above have the same meanings as those of $R^1$ to $R^3$ in Formula (1) above, and preferred ranges are also the same.

From the viewpoint of rinsing properties and film strength, $R^B$ above is preferably an ester bond or a urethane bond, and is more preferably an ester bond.

The divalent or n-valent linking group denoted by $L^1$ to $L^3$ above is preferably a group formed from at least one type of atom selected from the group consisting of a carbon atom, a hydrogen atom, an oxygen atom, a nitrogen atom, and a sulfur atom, and is more preferably a group formed from at least one type of atom selected from the group consisting of a carbon atom, a hydrogen atom, an oxygen atom, and a sulfur atom. The number of carbon atoms of $L^1$ to $L^3$ above is preferably 2 to 60, and more preferably 2 to 30.

The m-valent linking group denoted by $L^{s1}$ above is preferably a group formed from a sulfur atom and at least one type of atom selected from the group consisting of a carbon atom, a hydrogen atom, an oxygen atom, a nitrogen atom, and a sulfur atom, and is more preferably an alkylene group or a group formed by combining two or more from an alkylene group, a sulfide group, and an imino group. The number of carbon atoms of $L^{s1}$ above is preferably 2 to 60, and more preferably 6 to 30.

n and m above are independently integers of 1 to 10, more preferably integers of 2 to 10, yet more preferably integers of 2 to 6, and particularly preferably 2.

From the viewpoint of removability (rinsing properties) of engraving residue, the n-valent linking group denoted by $L^1$ and/or the divalent linking group denoted by $L^2$, or the divalent linking group denoted by $L^3$ preferably has an ether bond, and more preferably has an ether bond contained in an oxyalkylene group.

Furthermore, $L^{s1}$ and $L^3$ above preferably do not have an ester bond, an amide bond, a urethane bond, a urea bond, or an imino group.

Among compounds represented by Formula (A-1) or Formula (A-2), from the viewpoint of crosslinkability, etc., the n-valent linking group denoted by $L^1$ and/or the divalent linking group denoted by $L^2$ in Formula (A-1) are preferably groups having a sulfur atom.

Specific examples of Component A that can be applied to the present invention are shown below. Examples thereof include vinyltrichlorosilane, 1,3-bis(trichlorosilane)propane, 1,3-bis(tribromosilane)propane, vinyltrimethoxysilane, vinyltriethoxysilane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, γ-methacryloxypropylmethyldimethoxysilane, ρ-styryltrimethoxysilane, γ-methacryloxypropyltrimethoxysilane, γ-methacryloxypropylmethyldiethoxysilane, γ-methacryloxypropyltriethoxysilane, γ-acryloxypropyltrimethoxysilane, N-(β-aminoethyl)-γ-aminopropylmethyldimethoxysilane, N-(β-aminoethyl)-γ-aminopropyltrimethoxysilane, N-(β-aminoethyl)-γ-aminopropyltriethoxysilane, γ-aminopropyltrimethoxysilane, γ-aminopropyltriethoxysilane, N-phenyl-γ-aminopropyltrimethoxysilane, γ-mercaptopropyltrimethoxysilane, γ-mercaptopropyltriethoxysilane, mercaptomethyltrimethoxysilane, dimethoxy-3-mercaptopropylmethylsilane, 2-(2-aminoethylthioethyl)diethoxymethylsilane, 3-(2-acetoxyethylthiopropyl)dimethoxymethylsilane, 2-(2-aminoethylthioethyl)triethoxysilane, dimethoxymethyl-3-(3-phenoxypropylthiopropyl)silane, bis(triethoxysilylpropyl)disulfide, bis(triethoxysilylpropyl)tetrasulfide, 1,4-bis(triethoxysilyl)benzene, bis(triethoxysilyl)ethane, 1,6-bis(trimethoxysilyl)hexane, 1,8-bis(triethoxysilyl)octane, 1,2-bis(trimethoxysilyl)decane, bis(triethoxysilylpropyl)amine, bis(trimethoxysilylpropyl)urea, γ-chloropropyltrimethoxysilane, γ-triethoxysilylpropyl (meth)acrylate, γ-ureidopropyltriethoxysilane, trimethylsilanol, diphenylsilanediol, and triphenylsilanol. Other than the above, the compounds shown below can be cited as preferred examples, but the present invention should not be construed as being limited thereto.

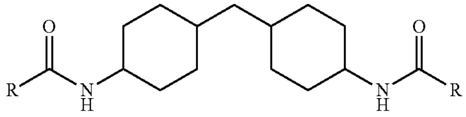

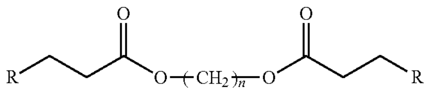

n = 2~20

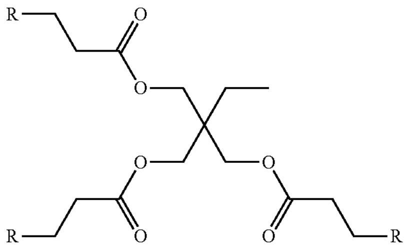

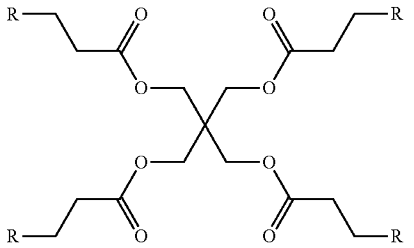

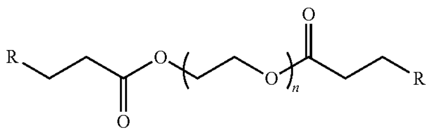

n = 1~50

-continued
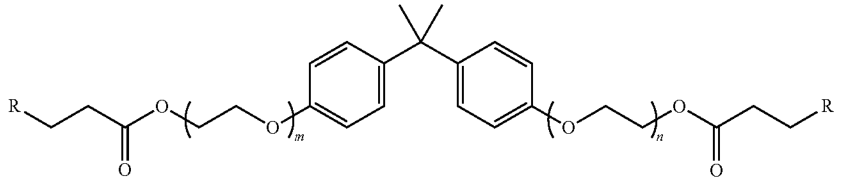
m + n = 2~50
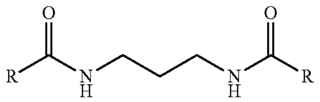
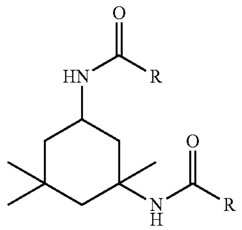
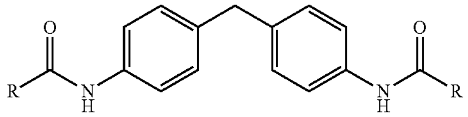
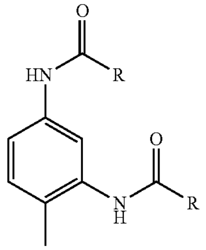
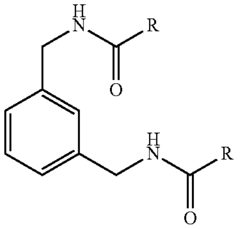
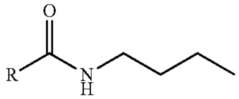
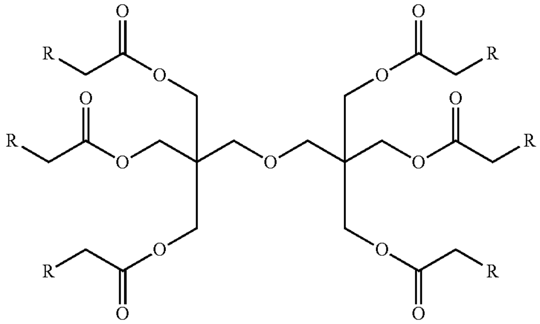
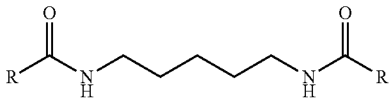
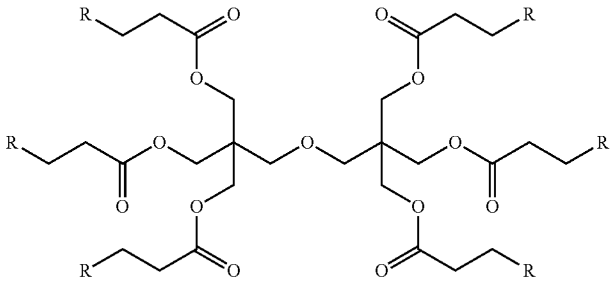
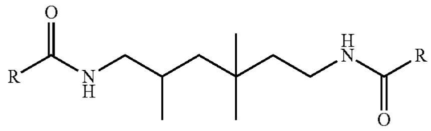
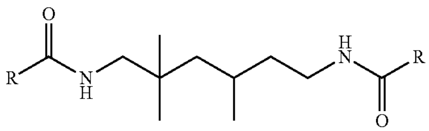
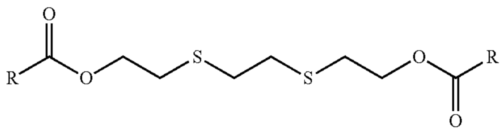
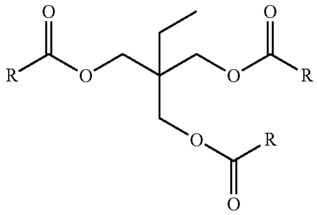
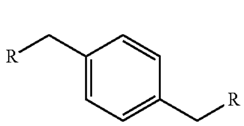
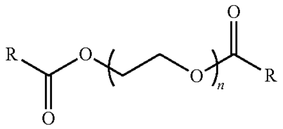
n = 1~50

-continued
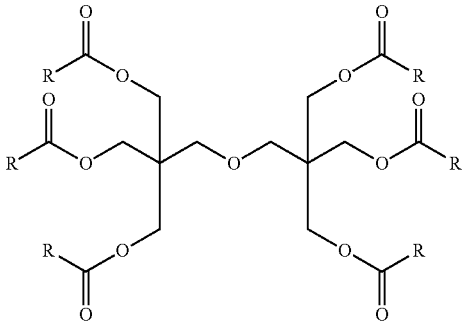
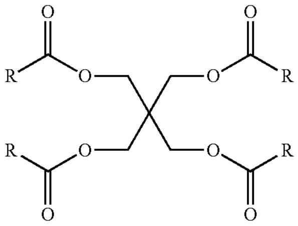
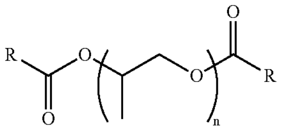
n = 1~50
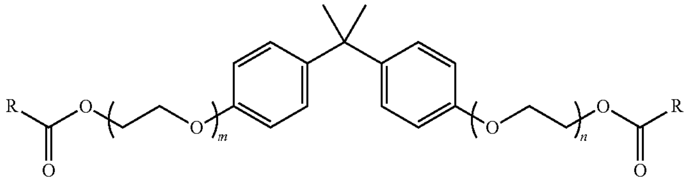
m + n = 0~50
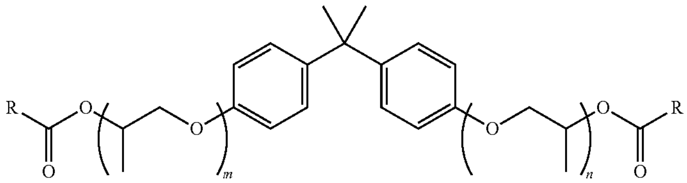
m + n = 0~50
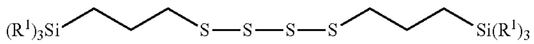
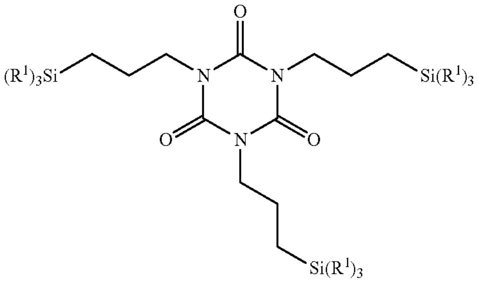
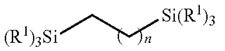
n = 1~20
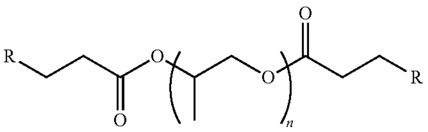
n = 1~50
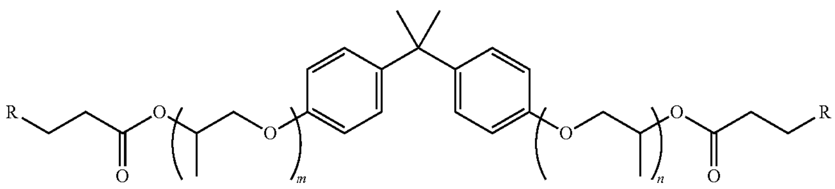
m + n = 2~50
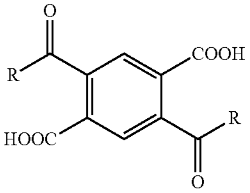
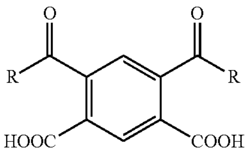
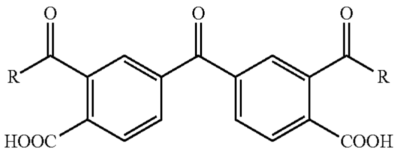
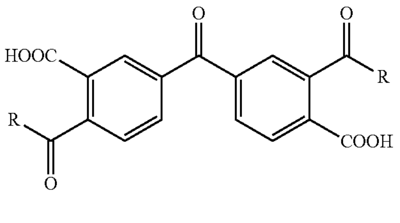

-continued

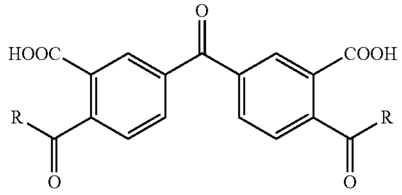

In each of the formulae above, R denotes a partial structure selected from the structures below. When a plurality of Rs and $R^1$s are present in the molecule, they may be identical to or different from each other, and are preferably identical to each other in terms of synthetic suitability.

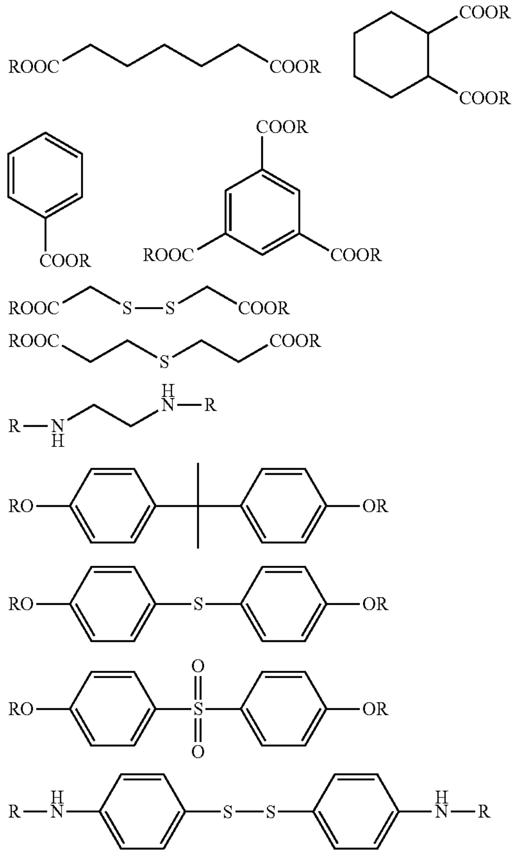

R: 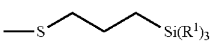 or 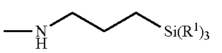

$R^1$: $—OCH_3$, $—OCH_2CH_3$, 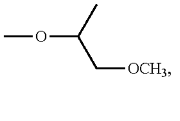, 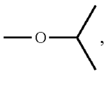,

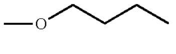 or 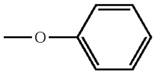

In each of the formulae above, R denotes a partial structure shown below. $R^1$ is the same as defined above. When a plurality of Rs and $R^1$s are present in the molecule, they may be identical to or different from each other, and in terms of synthetic suitability are preferably identical to each other.

R: 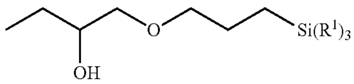

Component A may be obtained by synthesis as appropriate, but use of a commercially available product is preferable in terms of cost. Since Component A corresponds to for example commercially available silane products or silane coupling agents from Shin-Etsu Chemical Co., Ltd., Dow Corning Toray, Momentive Performance Materials Inc., Chisso Corporation, etc., the resin composition of the present invention may employ such a commercially available product by appropriate selection according to the intended application.

As Component A in the present invention, a partial hydrolysis-condensation product obtained using one type of compound having a hydrolyzable silyl group and/or a silanol group or a partial cohydrolysis-condensation product obtained using two or more types may be used. Hereinafter, these compounds may be called 'partial (co)hydrolysis-condensation products'.

Among silane compounds as partial (co)hydrolysis-condensation product precursors, from the viewpoint of versatility, cost, and film compatibility, a silane compound having a substituent selected from a methyl group and a phenyl group as a substituent on the silicon is preferable, and specific preferred examples of the precursor include methyltrimethoxysilane, methyltriethoxysilane, phenyltrimethoxysilane, phenyltriethoxysilane, dimethyldimethoxysilane, dimethyldiethoxysilane, diphenyldimethoxysilane, and diphenyldiethoxysilane.

In this case, as a partial (co)hydrolysis-condensation product, it is desirable to use a dimer (2 moles of silane compound is reacted with 1 mole of water to eliminate 2 moles of alcohol, thus giving a disiloxane unit) to 100-mer of the above-mentioned silane compound, preferably a dimer to 50-mer, and yet more preferably a dimer to 30-mer, and it is also possible to use a partial cohydrolysis-condensation product formed using two or more types of silane compounds as starting materials.

As such a partial (co)hydrolysis-condensation product, ones commercially available as silicone alkoxy oligomers may be used (e.g. those from Shin-Etsu Chemical Co., Ltd.) or ones that are produced in accordance with a standard method by reacting a hydrolyzable silane compound with less than an equivalent of hydrolytic water and then removing by-products such as alcohol and hydrochloric acid may be used. When the production employs, for example, an acyloxysilane or an alkoxysilane described above as a hydrolyzable silane compound starting material, which is a precursor, partial hydrolysis-condensation may be carried out using as a reaction catalyst an acid such as hydrochloric acid or sulfuric acid, an alkali metal or alkaline earth metal hydroxide such as sodium hydroxide or potassium hydroxide, or an alkaline organic material such as triethylamine, and when the production is carried out directly from a chlorosilane, water and alcohol may be reacted using hydrochloric acid by-product as a catalyst.

With regard to Component A in the resin composition of the present invention, only one type may be used or two or more types may be used in combination.

The content of Component A contained in the resin composition of the present invention is preferably in the range of 0.1 to 80 mass % on a solids content basis, more preferably in the range of 1 to 40 mass %, and most preferably in the range of 5 to 30 mass %.

(Component B) Thermoplastic Elastomer

The resin composition for laser engraving of the present invention comprises (Component B) a thermoplastic elastomer.

A thermoplastic elastomer is a material that becomes plasticized and flowable at high temperature and exhibits rubber elasticity at normal temperature (5° C. to 35° C.). At normal temperature, a thermoplastic elastomer forms a finely dispersed multiphase structure. In a majority of thermoplastic elastomers, phases are chemically bonded by block copolymerization or graft copolymerization. When there is no chemical bond, a sufficiently finely dispersed state is formed. Component B is preferably a thermoplastic elastomer in which phases are chemically bonded, and more preferably a block copolymer. The molecular structure of a block copolymer is formed from a soft segment such as a polyether or rubber molecule and a hard segment that does not exhibit plastic deformation at around normal temperature as in vulcanized rubber. It forms a multiphase structure in which the hard segment phase and the soft segment phase are finely dispersed. As a phase formed by the hard segment, various types exist, such as a frozen phase, a crystalline phase, a hydrogen-bonded phase, and an ionically-crosslinked phase.

Such a thermoplastic elastomer exhibits rubber elasticity at normal temperature. Because of this, it can deform according to irregularities of a printing material when carrying out printing and the ink laydown is excellent, and since its original shape is restored after departing from the printing material the printing durability is excellent. Furthermore, since a thermoplastic elastomer exhibits flowability upon heating, handling such as mixing of materials is easy. From these reasons, a thermoplastic elastomer is suitable when the resin composition for laser engraving of the present invention is applied to production of a relief printing plate that requires flexibility such as, for example, a flexographic plate.

From the viewpoint of printing durability and hardness of a relief printing plate, the proportion of the hard segment in the thermoplastic elastomer is preferably 10 to 70 mass %, and more preferably 15 to 60 mass %.

From the viewpoint of flexibility and rubber elasticity being exhibited, the thermoplastic elastomer is preferably a polymer having a glass transition temperature (Tg) of no greater than 20° C., and more preferably no greater than 0° C. From the viewpoint of printing durability, the thermoplastic elastomer is preferably a polymer having a melting point (Tm) of at least 70° C., and more preferably at least 100° C.

Examples of the thermoplastic elastomer include a styrene-based thermoplastic elastomer, an polyester-based thermoplastic elastomer, an olefin-based thermoplastic elastomer, an polyamide-based thermoplastic elastomer, a silicone-based thermoplastic elastomer, a vinyl chloride-based thermoplastic elastomer, a nitrile-based thermoplastic elastomer, a fluorine-based thermoplastic elastomer, and a crosslinked chlorinated polyethylene; among them a styrene-based thermoplastic elastomer, an polyester-based thermoplastic elastomer, and an olefin-based thermoplastic elastomer are preferable, and a styrene-based thermoplastic elastomer is more preferable. The thermoplastic elastomer in the present invention does not include a natural rubber. For the purpose of improving the laser engraving sensitivity of these thermoplastic elastomers, those in which an easily decomposable functional group such as a carbamoyl group or a carbonate group is introduced into the main chain of the elastomer may be used. A thermoplastic polymer and the above-mentioned thermally decomposable polymer may be mixed and used.

<Styrene-Based Thermoplastic Elastomer>

Examples of the styrene-based thermoplastic elastomer include a block copolymer of a polymer block (hard segment) mainly containing a styrene-based monomer-derived monomer unit and a polymer block (soft segment) mainly containing a conjugated diene compound-derived monomer unit, and one in which the conjugated diene compound-derived monomer unit of the block copolymer is hydrogenated.

Examples of the styrene-based monomer include styrene and a styrene derivative in which any site is substituted by at least one substituent (a halogen atom (F, Cl, Br, I), an alkyl group having 1 to 10 carbon atoms, an alkoxy group having 1 to 10 carbon atoms). Specific examples thereof include styrene, α-methylstyrene, vinyltoluene, and t-butylstyrene, and among them styrene is preferable.

Examples of the conjugated diene compound include butadiene, isoprene, chloroprene, and 2,3-dimethylbutadiene, and among them butadiene and isoprene are preferable.

Only one type thereof may be used, or two or more types thereof may be used in combination.

Specific examples of the styrene-based thermoplastic elastomer include a styrene-butadiene-styrene copolymer (SBS), a styrene-isoprene-styrene copolymer (SIS), a styrene-ethylene/butylene-styrene copolymer (SEBS), a styrene-ethylene/propylene-styrene copolymer (SEPS), and a styrene-ethylene-ethylene/propylene-styrene copolymer (SEEPS), and among them SIS, SBS, and SEBS are preferable.

<Polyester-Based Thermoplastic Elastomer>

Preferred examples of the polyester-based thermoplastic elastomer include a block copolymer formed by block copolymerization of a hard segment formed from a constituent unit represented by Formula (I) and a soft segment formed from a constituent unit represented by Formula (II).

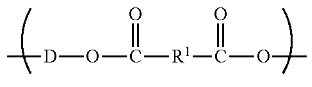

(I)

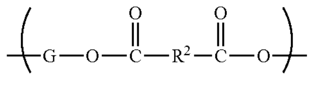

(II)

In Formula (I) and Formula (II), D denotes a divalent aliphatic residue having a molecular weight of no greater than 250, and is preferably a straight-chain or branched alkylene group having 2 to 20 carbon atoms, and more preferably a straight-chain alkylene group having 2 to 6 carbon atoms.

$R^1$ denotes an aromatic ring-containing divalent residue having a molecular weight of no greater than 300, and is preferably a phenylene group, which may have a substituent. Examples of the substituent include an alkyl group having 1 to 10 carbon atoms, an aryl group having 6 to 20 carbon atoms, an alkoxy group having 1 to 10 carbon atoms, a halogen atom (F, Cl, Br, I), an amino group, an alkylamino group having an alkyl group having 1 to 10 carbon atoms, and a dialkylamino group.

G denotes a divalent residue formed by removing a hydroxy group from the two terminals of a poly(alkylene oxide) glycol having an average molecular weight of 400 to 3,500.

$R^2$ denotes a divalent residue having a molecular weight of no greater than 300, and denotes an alkylene group having 1 to 30 carbon atoms or an arylene group having 6 to 30 carbon atoms. $R^2$ may have the substituent described for $R^1$.

Furthermore, in the present invention, a block copolymer formed by block copolymerization of a hard segment comprising a constituent unit represented by Formula (I') and a soft segment comprising a constituent unit represented by Formula (II') is preferable.

(I')

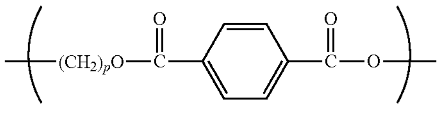

(II")

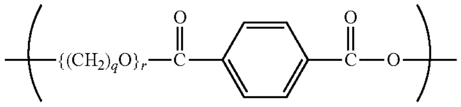

In Formula (I'), p denotes an integer of 2 to 4, and from the viewpoint of availability of materials it is preferably 2 or 4.

In Formula (II'), q denotes an integer of 2 to 10, and from the viewpoint of availability of materials it is preferably 2 to 4.

r denotes an integer of 2 to 500, and from the viewpoint of flexibility and rubber elasticity being exhibited it is preferably 5 to 100.

In the present invention, it is particularly preferable that an aromatic polyester comprising a constituent unit represented by Formula (I') above is tetramethylene terephthalate, and an aliphatic polyether comprising a constituent unit represented by Formula (II') above is an alkylene ether terephthalate. Specific examples include a polybutylene terephthalate/polytetramethylene ether glycol terephthalate block copolymer.

<Olefin-Based Thermoplastic Elastomer>

The olefin-based thermoplastic elastomer is one in which a polyolefin resin as a hard segment and an olefin-based elastomer as a soft segment form a multiphase.

The polyolefin as a hard segment is preferably polyethylene or polypropylene.

The olefin-based elastomer as a soft segment is preferably a copolymer formed from a monomer unit derived from ethylene and a constituent unit derived from an α-olefin unit having at least 3 carbon atoms.

Examples of the α-olefin unit having at least 3 carbon atoms include constituent units derived from α-olefins such as propylene, 1-butene, 2-methyl-1-butene, 3-methyl-1-butene, 1-pentene, 4-methyl-1-pentene, 1-hexene, 1-octene, 1-decene, and 1-octadecene.

Specific examples of the olefin-based thermoplastic elastomer include an ethylene-propylene random copolymer, an ethylene-butene random copolymer, an ethylene-hexene random copolymer, an ethylene-octene random copolymer, an ethylene-decene random copolymer, and an ethylene-4-methylpentene random copolymer, and among them an ethylene-propylene random copolymer and an ethylene-butene random copolymer are preferable.

<Ethylene-(meth)acrylate Ester-Based Thermoplastic Elastomer>

With regard to the ethylene-(meth)acrylate ester-based thermoplastic elastomer, examples thereof include a block copolymer comprising a polymer block (hard segment) mainly containing ethylene and a polymer block (soft segment) derived from a (meth)acrylate ester.

Examples of the (meth)acrylate ester include methyl(meth)acrylate, ethyl(meth)acrylate, n-butyl(meth)acrylate, isobutyl(meth)acrylate, isopentyl(meth)acrylate, n-hexyl(meth)acrylate, isooctyl(meth)acrylate, 2-ethylhexyl(meth)acrylate, n-octyl(meth)acrylate, isononyl(meth)acrylate, n-decyl(meth)acrylate, and isodecyl(meth)acrylate. These constituent units may be contained on their own or as a mixture of two or more types.

Furthermore, a terpolymer comprising a constituent unit derived from carbon monoxide in addition to the constituent units derived from ethylene and a (meth)acrylate ester is also preferable as an ethylene-(meth)acrylate ester-based thermoplastic elastomer.

Specific examples of the ethylene-(meth)acrylate ester-based thermoplastic elastomer include an ethylene/n-butyl acrylate/carbon monoxide copolymer and an ethylene/decyl acrylate/carbon monoxide copolymer, and among them an ethylene/n-butyl acrylate/carbon monoxide copolymer is preferable.

<Polyamide-Based Thermoplastic Elastomer>

As a polyamide-based thermoplastic elastomer, a multiblock copolymer comprising a polyamide as a hard segment and a polyester diol or polyether diol, which have a low glass transition temperature, as a soft segment can be cited as an example.

Here, examples of the polyamide component include nylon-6, -66, -610, -11, and -12, and among them nylon-6 and nylon-12 are preferable.

Examples of the polyether diol include poly(oxytetramethylene)glycol and poly(oxypropylene)glycol.

Examples of the polyester diol include poly(ethylene-1,4-adipate)glycol, poly(butylene-1,4-adipate)glycol, and polytetramethylene glycol. Specific examples of the polyamide-based elastomer include a nylon 12/polytetramethylene glycol block copolymer.

In the present invention, only one type of thermoplastic elastomer may be used or two or more types thereof may be used in combination. From the viewpoint of the balance between shape retention of a coated film and engraving sensitivity, the content of thermoplastic elastomer is preferably 2 to 95 mass % of the total solids content, and more preferably 50 to 80 mass %.

From the viewpoint of shape retention and solubility in a solvent when preparing a relief-forming layer, the thermoplastic elastomer preferably has a weight-average molecular weight of 5,000 to 500,000, more preferably 10,000 to 400,000, and yet more preferably 15,000 to 300,000.

From the viewpoint of reactivity with Component A, the solvent used when preparing the resin composition for laser engraving of the present invention preferably mainly comprises an aprotic organic solvent. When a protic organic solvent is used in combination, it is preferable that aprotic organic solvent/protic organic solvent=100/0 to 50/50 (ratio by mass), more preferably 100/0 to 70/30, and yet more preferably 100/0 to 90/10.

Examples of the aprotic organic solvent include acetonitrile, tetrahydrofuran, dioxane, toluene, propylene glycol monomethyl ether acetate, methyl ethyl ketone, acetone, methyl isobutyl ketone, ethyl acetate, butyl acetate, ethyl lactate, N,N-dimethylacetamide, N-methylpyrrolidone, and dimethyl sulfoxide.

Examples of the protic organic solvent include methanol, ethanol, 1-propanol, 2-propanol, 1-butanol, 1-methoxy-2-propanol, ethylene glycol, diethylene glycol, and 1,3-propanediol.

(Component C) Polymerizable Compound

From the viewpoint of forming a crosslinked structure in a relief-forming layer, the resin composition for laser engraving of the present invention comprises (Component C) a polymerizable compound. Component C is preferably a compound that does not have a hydrolyzable silyl group and/or a silanol group.

The polymerizable compound may be freely selected from compounds having at least one, preferably at least two, more preferably 2 to 6, and yet more preferably two ethylenically unsaturated groups. Examples of the polymerizable compound include polymerizable compounds described in JP-A-2009-255510 and paragraphs 0098 to 0124 of JP-A-2009-204962.

A monofunctional monomer having one ethylenically unsaturated group in the molecule and a polyfunctional monomer having two or more ethylenically unsaturated groups in the molecule are explained below.

Since it is necessary to form a crosslinked structure in the relief-forming layer in the present invention, a polyfunctional monomer is preferably used. The molecular weight of these polyfunctional monomers is preferably 120 to 3,000, and more preferably 200 to 2,000.

Examples of the monofunctional monomer and polyfunctional monomer include an ester of an unsaturated carboxylic acid (e.g. acrylic acid, methacrylic acid, itaconic acid, crotonic acid, isocrotonic acid, maleic acid, etc.) and a polyhydric alcohol compound and an amide of an unsaturated carboxylic acid and a polyamine compound.

In the present invention, a di(meth)acrylate having an alkylene group having 1 to 20 carbon atoms is preferable, a di(meth)acrylate having a straight-chain or branched alkylene group having 2 to 10 carbon atoms is more preferable, and a di(meth)acrylate having a straight-chain alkylene group having 3 to 6 carbon atoms is yet more preferable. The alkylene group may have a substituent, and examples of the substituent include a hydroxy group.

From the viewpoint of improving engraving sensitivity, it is possible in the present invention to use as the polymerizable compound a compound having a sulfur atom in the molecule.

As such a polymerizable compound having a sulfur atom in the molecule, it is preferable from the viewpoint of improving engraving sensitivity in particular to use a polymerizable compound having two or more ethylenically unsaturated bonds and having a carbon-sulfur bond at a site where two ethylenically unsaturated bonds among them are linked (hereinafter, called a 'sulfur-containing polyfunctional monomer' as appropriate).

Examples of carbon-sulfur bond-containing functional groups of the sulfur-containing polyfunctional monomer in the present invention include sulfide, disulfide, sulfoxide, sulfonyl, sulfonamide, thiocarbonyl, thiocarboxylic acid, dithiocarboxylic acid, sulfamic acid, thioamide, thiocarbamate, dithiocarbamate, and thiourea-containing functional groups.

Furthermore, a linking group containing a carbon-sulfur bond linking two ethylenically unsaturated bonds of the sulfur-containing polyfunctional monomer is preferably at least one unit selected from —C—S—, —C—S—S—, —NHC(=S)O—, —NHC(=O)S—, —NHC(=S)S—, and —C—$SO_2$—.

Moreover, the number of sulfur atoms contained in the sulfur-containing polyfunctional monomer molecule is not particularly limited as long as it is one or more, and may be selected as appropriate according to the intended application, but from the viewpoint of a balance between engraving sensitivity and solubility in a coating solvent it is preferably 1 to 10, more preferably 1 to 5, and yet more preferably 1 or 2.

From the viewpoint of flexibility of a film that is formed, the molecular weight of the sulfur-containing polyfunctional monomer in the present invention is preferably 120 to 3,000, and more preferably 120 to 1,500.

In accordance with the use of a polymerizable compound in the resin composition of the present invention, it is possible to adjust film physical properties such as brittleness and flexibility of a relief-forming layer.

Furthermore, from the viewpoint of flexibility or brittleness of a crosslinked film, the content of the polymerizable compound in the resin composition for laser engraving of the present invention is preferably 5 to 60 mass % on a solids content basis, and more preferably 8 to 30 mass %.

(Component D) Alcohol Exchange Reaction Catalyst

The resin composition of the present invention preferably comprises (Component D) an alcohol exchange reaction catalyst in order to promote formation of a crosslinked structure from Component A. The alcohol exchange reaction catalyst may be used without any restrictions as long as it is a reaction catalyst generally used in a silane coupling reaction. Hereinafter, (Component D-1) an acidic or basic catalyst and (Component D-2) a metal complex catalyst, which are representative alcohol exchange reaction catalysts, are explained in sequence.

(Component D-1) Acidic or Basic Catalyst

As the catalyst, an acidic or basic compound is used as it is or in the form of a solution in which it is dissolved in a solvent such as water or an organic solvent (hereinafter, also called an acidic catalyst or basic catalyst respectively). The concentration when dissolved in a solvent is not particularly limited, and it may be selected appropriately according to the properties of the acidic or basic compound used, desired catalyst content, etc.

Examples of the acidic catalyst include a hydrogen halide such as hydrochloric acid, nitric acid, sulfuric acid, sulfurous acid, hydrogen sulfide, perchloric acid, hydrogen peroxide, carbonic acid, a carboxylic acid such as formic acid or acetic acid, a carboxylic acid in which R of the structural formula RCOOH is substituted with another element or substituent, a sulfonic acid such as benzenesulfonic acid, phosphoric acid, a heteropoly acid, and an inorganic solid acid.

Examples of the basic catalyst include an ammoniacal base such as aqueous ammonia, an amine, an alkali metal hydroxide, an alkali metal alkoxide, an alkaline earth oxide, a quaternary ammonium salt compound, and a quaternary phosphonium salt compound.

Examples of the amine include (a) a hydrogenated nitrogen compound such as hydrazine; (b) an aliphatic amine, alicyclic amine or aromatic amine; (c) a condensed ring-containing cyclic amine; (d) an oxygen-containing amine such as an amino acid, an amide, an alcoholamine, an ether amine, an imide or a lactam; and (e) a heteroelement-containing amine having a heteroatom such as S or Se.

As the aliphatic amine (b), an amine compound represented by Formula (D-1) is preferable.

$$N(R^{d1})(R^{d2})(R^{d3}) \qquad (D-1)$$

In Formula (D-1), $R^{d1}$ to $R^{d3}$ independently denote a hydrogen atom, a straight-chain or branched alkyl group having 1 to 10 carbon atoms, a cycloalkyl group having 5 to 10 carbon atoms, an aryl group having 6 to 20 carbon atoms, or a 3- to 10-membered sulfur atom- or oxygen atom-containing heterocycle having (preferably a thiophene ring), and the alkyl group and cycloalkyl group may have at least one unsaturated bond.

The amine compound represented by Formula (D-1) may have a substituent, and examples of the substituent include an alkyl group having 1 to 10 carbon atoms, an aryl group having 6 to 20 carbon atoms, an amino group, a (di)alkylamino group having an alkyl group having 1 to 6 carbon atoms, and a hydroxy group.

Two or more groups among $R^{d1}$ to $R^{d3}$ above may be bonded to form a C═N bond. Examples of an amine compound having a C═N bond include guanidine and 1,1,3,3-tetramethylguanidine.

Examples of the alicyclic amine (b) include an alicyclic amine in which a ring skeleton, where two or more groups among $R^{d1}$ to $R^{d3}$ in a compound represented by Formula (D-1) above are bonded, contains a nitrogen atom. Examples of the alicyclic amine include pyrrolidine, piperidine, piperazine, and quinuclidine.

Examples of the aromatic amine (b) include imidazole, pyrrole, pyridine, pyridazine, pyrazine, purine, quinoline, and quinazoline. The aromatic amine may have a substituent, and examples of the substituent include substituents described for Formula (D-1).

Furthermore, two or more identical or different aliphatic amines, alicyclic amines, or aromatic amines may be bonded to form a polyamine such as a diamine or a triamine. The polyamine is preferably a polyamine in which aliphatic amines are bonded, and examples thereof include hexamethylenetetramine and polyethyleneimine (Epomin, Nippon Shokubai Co., Ltd.). In the present invention, component D is preferably a polyamine, and more preferably a polyethyleneimine.

The cyclic amine (c) containing a condensed ring is a cyclic amine in which at least one nitrogen atom is contained in a ring skeleton forming a condensed ring; examples thereof include 1,8-diazabicyclo[5.4.0]undec-7-ene, 1,5-diazabicyclo[4.3.0]non-5-ene, and 1,4-diazabicyclo[2.2.2]octane, and 1,8-diazabicyclo[5.4.0]undec-7-ene is preferable.

Examples of the oxygen-containing amine (d) such as an amino acid, an amide, an alcoholamine, an ether amine, an imide, or a lactam include phthalimide, 2,5-piperazinedione, maleimide, caprolactam, pyrrolidone, morpholine, glycine, alanine, and phenylalanine.

In addition, (c) and (d) may have the substituent described for a compound represented by Formula (D-1), and among them an alkyl group having 1 to 6 carbon atoms is preferable.

As the amine compound in the present invention, (b) and (c) are preferable. As (b), an aliphatic amine is preferable, a polyamine of an aliphatic amine is more preferable, and polyethyleneimine is yet more preferable. As (c), 1,8-diazabicyclo[5.4.0]undec-7-ene is preferable.

From the viewpoint of film strength after thermal crosslinking, the amine preferably has a pKaH (an acid dissociation constant of the conjugate acid) of at least 7, and more preferably at least 10.

Among the above-mentioned acidic or basic catalysts, from the viewpoint of an alcohol exchange reaction progressing quickly in the film, methanesulfonic acid, p-toluenesulfonic acid, pyridinium p-toluenesulfonate, dodecylbenzenesulfonic acid, phosphoric acid, phosphonic acid, acetic acid, polyethyleneimine, 1,8-diazabicyclo[5.4.0]undec-7-ene, 1,5-diazabicyclo[4.3.0]non-5-ene, and 1,1,3,3-tetramethylguanidine are preferable, and phosphoric acid, polyethyleneimine, and 1,8-diazabicyclo[5.4.0]undec-7-ene are particularly preferable.

(D-2) Metal Complex Catalyst

The metal complex catalyst (D-2) that can be used as an alcohol exchange reaction catalyst in the present invention is preferably constituted from a metal element selected from Groups 2, 4, 5, and 13 of the periodic table and an oxo or hydroxy oxygen compound selected from β-diketones, ketoesters, hydroxycarboxylic acids and esters thereof, amino alcohols, and enolic active hydrogen compounds.

Furthermore, among the constituent metal elements, a Group 2 element such as Mg, Ca, Sr, or Ba, a Group 13 element such as Al or Ga, a Group 4 element such as Ti or Zr, and a Group 5 element such as V, Nb, or Ta are preferable, and they form a complex having an excellent catalytic effect. Among them, a complex obtained from Zr, Al, or Ti (ethyl orthotitanate, etc.) is excellent and preferable.

In the present invention, examples of the oxo or hydroxy oxygen-containing compound constituting a ligand of the above-mentioned metal complex include β-diketones such as acetylacetone(2,4-pentanedione) and 2,4-heptanedione, ketoesters such as methyl acetoacetate, ethyl acetoacetate, and butyl acetoacetate, hydroxycarboxylic acids and esters thereof such as lactic acid, methyl lactate, salicylic acid, ethyl salicylate, phenyl salicylate, malic acid, tartaric acid, and methyl tartarate, ketoalcohols such as 4-hydroxy-4-methyl-2-pentanone, 4-hydroxy-2-pentanone, 4-hydroxy-4-methyl-2-pentanone, and 4-hydroxy-2-heptanone, amino alcohols such as monoethanolamine, N,N-dimethylethanolamine, N-methylmonoethanolamine, diethanolamine, and triethanolamine, enolic active compounds such as methylolmelamine, methylolurea, methylolacrylamide, and diethyl malonate ester, and compounds having a substituent on the methyl group, methylene group, or carbonyl carbon of acetylacetone.

A preferred ligand is an acetylacetone derivative, and the acetylacetone derivative in the present invention means a compound having a substituent on the methyl group, methylene group, or carbonyl carbon of acetylacetone. The substituent with which the methyl group of acetylacetone is substituted is a straight-chain or branched alkyl group, acyl group, hydroxyalkyl group, carboxyalkyl group, alkoxy group, or alkoxyalkyl group that all have 1 to 3 carbon atoms, the substituent with which the methylene carbon of acetylacetone is substituted is a carboxy group or a straight-chain or branched carboxyalkyl group or hydroxyalkyl group having 1 to 3 carbon atoms, and the substituent with which the carbonyl carbon of acetylacetone is substituted is an alkyl group having 1 to 3 carbon atoms, and in this case the carbonyl oxygen turns into a hydroxy group by addition of a hydrogen atom.

Specific preferred examples of the acetylacetone derivative include acetylacetone, ethylcarbonylacetone, n-propylcarbonylacetone, i-propylcarbonylacetone, diacetylacetone, 1-acetyl-1-propionylacetylacetone, hydroxyethylcarbonylacetone, hydroxypropylcarbonylacetone, acetoacetic acid, acetopropionic acid, diacetoacetic acid, 3,3-diacetopropionic acid, 4,4-diacetobutyric acid, carboxyethylcarbonylacetone, carboxypropylcarbonylacetone, and diacetone alcohol, and among them acetylacetone and diacetylacetone are preferable. The complex of the acetylacetone derivative and the metal element is a mononuclear complex in which 1 to 4 molecules of acetylacetone derivative coordinate to one metal element, and when the number of coordinatable sites of the metal element is larger than the total number of coordinatable bond sites of the acetylacetone derivative, a ligand that is usually used in a normal complex, such as a water molecule, a halide ion, a nitro group, or an ammonio group may coordinate thereto.

Preferred examples of the metal complex include a tris (acetylacetonato)aluminum complex salt, a di(acetylacetonato)aluminum-aqua complex salt, a mono(acetylacetonato) aluminum-chloro complex salt, a di(diacetylacetonato) aluminum complex salt, ethyl acetoacetate aluminum diisopropylate, aluminum tris(ethyl acetoacetate), cyclic aluminum oxide isopropylate, a tris(acetylacetonato)barium complex salt, a di(acetylacetonato)titanium complex salt, a tris(acetylacetonato)titanium complex salt, a di-i-propoxy-bis(acetylacetonato)titanium complex salt, zirconium tris (ethyl acetoacetate), and a zirconium tris(benzoic acid) complex salt. They are excellent in terms of stability in an aqueous coating solution and an effect in promoting gelling in a sol-gel reaction when thermally drying, and among them ethyl acetoacetate aluminum diisopropylate, aluminum tris(ethyl acetoacetate), a di(acetylacetonato)titanium complex salt, and zirconium tris(ethyl acetoacetate) are particularly preferable.

The resin composition of the present invention may employ only one type of alcohol exchange reaction catalyst (D) or two or more types thereof in combination. The content of alcohol exchange reaction catalyst (D) in the resin composition is preferably 0.01 to 20 mass % relative to the total solids content of the relief-forming layer, and more preferably 0.1 to 10 mass %.

(Component E) Polymerization Initiator

When the resin composition for laser engraving of the present invention is used for preparing a relief-forming layer, it preferably further comprises (Component E) a polymerization initiator.

As the polymerization initiator, radical polymerization initiator is preferable, and compounds described in paragraphs 0074 to 0118 of JP-A-2008-63554 is preferable.

Examples of the radical polymerization initiator include an aromatic ketone, an onium salt compound, an organic peroxide, a thio compound, a hexaarylbiimidazole compound, a ketoxime ester compound, a borate compound, an azinium compound, a metallocene compound, an active ester compound, a compound having a carbon halogen bond, and an azo-based compound. Among them, from the viewpoint of engraving sensitivity and good relief edge shape when applied to a relief-forming layer of a relief printing starting plate, an organic peroxide and an azo-based compound are preferable, and an organic peroxide is particularly preferable.

As the organic peroxide, compounds described in JP-A-2008-63554 and JP-A-2008-233244 are preferable, and t-butyl peroxybenzoate is particularly preferable.

Furthermore, as a compound that is preferably used in combination, since use of an organic peroxide and a photothermal conversion agent in combination greatly increases the engraving sensitivity, it is most preferable to employ a mode in which an organic peroxide and carbon black, which is a photothermal conversion agent, are used in combination.

This is because, when a relief-forming layer is cured by thermal crosslinking using an organic peroxide, unreacted organic peroxide that is not involved in radical formation remains, but the remaining organic peroxide functions as a self-reactive additive and decomposes exothermically during laser engraving. It is surmised that, as a result, an amount corresponding to the heat generated is added to the irradiated laser energy, and the engraving sensitivity is thus increased.

Although this is described above in explanation of a photothermal conversion agent, this effect is outstanding when carbon black is used as a photothermal conversion agent. It is surmised that, as a result of heat generated from carbon black being transmitted to an organic peroxide, heat is generated not only from the carbon black but also from the organic peroxide, and thermal energy that is used for decomposition of Component B, etc. is generated synergistically.

With regard to the polymerization initiator, one type may be used on its own or two or more types may be used in combination. From the viewpoint of printing durability, the content of the polymerization initiator in the resin composition of the present invention is preferably 0.01 to 10 mass % relative to the total solids content by mass of the relief-forming layer, and more preferably 0.1 to 3 mass %.

(Component F) Photothermal Conversion Agent

The resin composition for laser engraving of the present invention preferably comprises a photothermal conversion agent.

It is surmised that the photothermal conversion agent absorbs laser light and generates heat thus promoting thermal decomposition of a cured material of the resin composition for laser engraving. Because of this, it is preferable to select a photothermal conversion agent that absorbs light having the wavelength of the laser that is used for engraving.

When a laser (a YAG laser, a semiconductor laser, a fiber laser, a surface emitting laser, etc.) emitting infrared at a wavelength of 700 nm to 1,300 nm is used as a light source for laser engraving, it is preferable for the relief-forming layer in the present invention to comprise a photothermal conversion agent that can absorb light having a wavelength of 700 nm to 1,300 nm.

As the photothermal conversion agent, various types of dye or pigment are used.

With regard to the photothermal conversion agent, examples of dyes that can be used include commercial dyes and known dyes described in publications such as 'Senryo Binran' (Dye Handbook) (Ed. by The Society of Synthetic Organic Chemistry, Japan, 1970). Specific examples include dyes having a maximum absorption wavelength at 700 nm to 1,300 nm, such as azo dyes, metal complex salt azo dyes, pyrazolone azo dyes, naphthoquinone dyes, anthraquinone dyes, phthalocyanine dyes, carbonium dyes, diimmonium compounds, quinone imine dyes, methine dyes, cyanine dyes, squarylium colorants, pyrylium salts, and metal thiolate complexes. In particular, cyanine-based colorants such as heptamethine cyanine colorants, oxonol-based colorants such as pentamethine oxonol colorants, and phthalocyanine-based colorants are preferably used. Examples include dyes described in paragraphs 0124 to 0137 of JP-A-2008-63554.

With regard to the photothermal conversion agent used in the present invention, examples of pigments include commercial pigments and pigments described in the Color Index (C.I.) Handbook, 'Saishin Ganryo Binran' (Latest Pigments Handbook) (Ed. by Nippon Ganryo Gijutsu Kyokai, 1977), 'Saisin Ganryo Ouyogijutsu' (Latest Applications of Pigment Technology) (CMC Publishing, 1986), 'Insatsu Inki Gijutsu' (Printing Ink Technology) CMC Publishing, 1984). Examples of pigments include that described in paragraphs 0122 to 0125 in JP-A-2009-178869. Among these pigments, carbon black is preferable.

Any carbon black, regardless of classification by ASTM and application (e.g. for coloring, for rubber, for dry cell, etc.), may be used as long as dispersibility, etc. in the composition is stable. Carbon black includes for example furnace black, thermal black, channel black, lamp black, and acetylene black. In order to make dispersion easy, a black colorant such as carbon black may be used as color chips or a color paste by dispersing it in nitrocellulose or a binder in advance using, as necessary, a dispersant, and such chips and paste are readily available as commercial products. Examples include carbon blacks described in paragraphs 0130 to 0134 of JP-A-2009-178869.

The content of the photothermal conversion agent in the resin composition for laser engraving of the present invention largely depends on the size of the molecular extinction coefficient characteristic to the molecule, and is preferably 0.01 to 30 wt % relative to the total weight of the solids content of the resin composition, more preferably 0.05 to 20 wt %, and yet more preferably 0.1 to 10 wt %.

Other Components

The resin composition of the present invention may comprise, in addition to Component A to Component F, various types of compounds according to the intended application as long as the effects of the present Invention are not impaired. In addition to Component B above, the resin composition for laser engraving of the present invention may employ in combination a known binder polymer that is not included in Component B. For example, from the viewpoint of laser engraving sensitivity, a polymer containing a partial structure that thermally decomposes upon exposure to light or heat is preferable. Furthermore, for example, in the case in which formation of a film that is pliable and has flexibility is targeted, a soft resin is selected. Moreover, from the viewpoint of ease of preparation of a composition for a relief-forming layer and improvement of resistance to an oil-based ink for a resulting relief printing plate, it is preferable to use a hydrophilic or alcoholphilic polymer. These components are described in JP-A-2008-163081.

Furthermore, a polyester formed from a hydroxycarboxylic acid unit such as a polylactic acid may be preferably used. As such a polyester, specifically, one selected from the group consisting of a polyhydroxyalkanoate (PHA), a lactic acid-based polymer, polyglycolic acid (PGA), polycaprolactone (PCL), poly(butylenesuccinic acid), derivatives thereof, and mixtures thereof is preferable.

A polymer having a carbon-carbon unsaturated bond in a side chain may be obtained by introducing, into a side chain of the skeleton of the above-mentioned binder polymer applicable to the present invention, a carbon-carbon unsaturated bond such as an allyl group, an acryloyl group, a methacryloyl group, a styryl group, or a vinyl ether group.

In this way, a binder polymer may be selected according to the intended purpose while taking into consideration physical properties that meet the intended application of the relief printing plate, and with regard to the binder polymers one type or two or more types in combination may be used.

The resin composition for laser engraving of the present invention may comprise as appropriate various types of known additives as long as the effects of the present invention are not inhibited. Examples include a vulcanizing agent, a filler, a plasticizer, a wax, a process oil, an organic acid, a metal oxide, an antiozonant, an anti-aging agent, a thermopolymerization inhibitor, and a colorant, and one type thereof may be used on its own or two or more types may be used in combination.

When a process oil is used, examples include an aromatic-based process oil, a naphthene-based process oil, and a paraffin-based process oil. The amount thereof added is preferably 1 to 70 parts by mass per 100 parts by mass of Component B.

The organic acid may be used in the form of a metal salt as an adjuvant for promotion of vulcanization in combination with a standard vulcanizing agent. Examples of the organic acid include stearic acid, oleic acid, and murastic acid. Examples of a metal source used in combination include metal oxides such as zinc oxide (flowers of zinc) and magnesium oxide. It is thought that an organic acid and a metal oxide form a metal salt in rubber during a vulcanization step, thus promoting activation of a vulcanizing agent such as sulfur. In order to form such a metal salt in the system, the amount of metal oxide added is preferably 0.1 to 10 parts by mass per 100 parts by mass of the thermoplastic elastomer (Component B), and more preferably 2 to 10 parts by mass.

The amount of organic acid added is preferably 0.1 to 5 parts by mass per 100 parts by mass of the thermoplastic elastomer (Component B), and more preferably 0.1 to 3 parts by mass.

Relief Printing Starting Plate for Laser Engraving

A first embodiment of the relief printing plate precursor for laser engraving of the present invention comprises a relief-forming layer formed from the resin composition for laser engraving of the present invention.

A second embodiment of the relief printing starting plate for laser engraving of the present invention comprises a crosslinked relief-forming layer formed by crosslinking a relief-forming layer formed from the resin composition for laser engraving of the present invention.

In the present invention, the 'relief printing starting plate for laser engraving' means both or one of a starting plate having a crosslinkable relief-forming layer formed from the resin composition for laser engraving in a state before being crosslinked and a starting plate in a state in which it is cured by light or heat.

In the present invention, the 'relief-forming layer' means a layer in a state before being crosslinked, that is, a layer formed from the resin composition for laser engraving of the present invention, which may be dried as necessary.

In the present invention, the 'crosslinked relief-forming layer' means a layer formed by crosslinking the relief-forming layer. The crosslinking is preferably carried out by means of heat and/or light. Furthermore, the crosslinking is not particularly limited as long as it is a reaction by which the resin composition is cured, it is a concept that includes a structure crosslinked due to a reaction between Components A or between Components C, and it is preferable to form a crosslinked structure by a reaction of Component A and/or Component C with Component B.

The 'relief printing plate' is prepared by laser-engraving a printing starting plate having a crosslinked relief-forming layer.

Moreover, in the present invention, the 'relief layer' means a layer of the relief printing plate formed by engraving using a laser, that is, the crosslinked relief-forming layer after laser engraving.

A relief printing starting plate for laser engraving of the present invention comprises a relief-forming layer formed from the resin composition for laser engraving of the present invention, which has the above-mentioned components. The (crosslinked) relief-forming layer is preferably provided above a support.

The (crosslinked) relief printing starting plate for laser engraving may further comprise, as necessary, an adhesive layer between the support and the (crosslinked) relief-forming layer and, above the relief-forming layer, a slip coat layer and a protection film.

<Relief-Forming Layer>

The relief-forming layer is a layer formed from the resin composition for laser engraving of the present invention. The relief printing starting plate for laser engraving of the present invention comprises a relief-forming layer to which the function of crosslinkability is imparted by Component A and/or Component C or a crosslinked relief forming layer having a crosslinked structure due to Component A and/or Component C.

As a mode in which a relief printing plate is prepared using the relief printing starting plate for laser engraving, a mode in which a relief printing plate is prepared by crosslinking a relief-forming layer to thus form a relief printing starting plate having a crosslinked relief-forming layer, and the crosslinked relief-forming layer (hard relief-forming layer) is then laser-engraved to thus form a relief layer is preferable. By crosslinking the relief-forming layer, it is possible to prevent abrasion of the relief layer during printing, and it is possible to obtain a relief printing plate having a relief layer with a sharp shape after laser engraving.

The relief-forming layer may be formed by molding the resin composition for laser engraving that has the above-mentioned components for a relief-forming layer into a sheet shape or a sleeve shape. The relief-forming layer is usually provided above a support, which is described later, but it may be formed directly on the surface of a member such as a cylinder of equipment for plate making or printing or may be placed and immobilized thereon, and a support is not always required.

A case in which the relief-forming layer is mainly formed in a sheet shape is explained as an Example below.

Support

A material used for the support of the relief printing starting plate for laser engraving is not particularly limited, but one having high dimensional stability is preferably used, and examples thereof include metals such as steel, stainless steel, or aluminum, plastic resins such as a polyester (e.g. polyethylene terephthalate (PET), polybutylene terephthalate (PBT), or polyacrylonitrile (PAN)) or polyvinyl chloride, synthetic rubbers such as styrene-butadiene rubber, and glass fiber-reinforced plastic resins (epoxy resin, phenolic resin, etc.). As the support, a PET film or a steel substrate is preferably used. The configuration of the support depends on whether the relief-forming layer is in a sheet shape or a sleeve shape.

Adhesive Layer

An adhesive layer may be provided between the relief-forming layer and the support for the purpose of strengthening the adhesion between the two layers. Examples of materials (adhesives) that can be used in the adhesive layer include those described in 'Handbook of Adhesives', Second Edition, Ed by I. Skeist, (1977).

Protection Film, Slip Coat Layer

For the purpose of preventing scratches or dents in the relief-forming layer surface or the crosslinked relief-forming layer surface, a protection film may be provided on the relief-forming layer surface or the crosslinked relief-forming layer surface. The thickness of the protection film is preferably 25 to 500 μm, and more preferably 50 to 200 μm. The protection film may employ, for example, a polyester-based film such as PET or a polyolefin-based film such as PE (polyethylene) or PP (polypropylene). The surface of the film may be made matte. The protection film is preferably peelable.

<Process for Producing Relief Printing Starting Plate for Laser Engraving>

Formation of a relief-forming layer in the relief printing starting plate for laser engraving is not particularly limited, and examples thereof include a method in which a resin composition for laser engraving is prepared, solvent is removed from this coating solution composition for laser engraving, and it is then melt-extruded onto a support. Alternatively, a method may be employed in which a resin composition for laser engraving is cast onto a support, and this is dried in an oven to thus remove solvent from the resin composition.

Among them, the process for producing a relief printing starting plate for laser engraving of the present invention is preferably a production process comprising a layer formation step of forming a relief-forming layer from the resin composition for laser engraving of the present invention and a crosslinking step of crosslinking the relief-forming layer by means of heat and/or light to thus obtain a relief printing starting plate having a crosslinked relief-forming layer.

Subsequently, as necessary, a protection film may be laminated on the relief-forming layer. Laminating may be carried out by compression-bonding the protection film and the relief-forming layer by means of heated calendar rollers, etc. or putting a protection film into intimate contact with a relief-forming layer whose surface is impregnated with a small amount of solvent.

When a protection film is used, a method in which a relief-forming layer is first layered on a protection film and a support is then laminated may be employed.

When an adhesive layer is provided, it may be dealt with by use of a support coated with an adhesive layer. When a slip coat layer is provided, it may be dealt with by use of a protection film coated with a slip coat layer.

<Layer Formation Step>

The process for producing the relief printing starting plate for laser engraving of the present invention preferably comprises a layer formation step of forming a relief-forming layer from the resin composition for laser engraving of the present invention.

Preferred examples of a method for forming the relief-forming layer include a method in which the resin composition for laser engraving of the present invention is prepared, solvent is removed as necessary from this resin composition for laser engraving, and it is then melt-extruded onto a support and a method in which the resin composition for laser engraving of the present invention is prepared, the resin composition for laser engraving of the present invention is cast onto a support, and this is dried in an oven to thus remove solvent.

The resin composition for laser engraving may be produced by, for example, dissolving Component A to Component C and as optional components Component D to Component F, a vulcanizing agent, a fragrance, and a plasticizer in an appropriate solvent, and then dissolving a polymerizable compound and a polymerization initiator. It is necessary to remove most of the solvent component in a stage of producing a relief printing starting plate. It is preferable to use as the solvent a volatile one and adjust the temperature, etc. to thus reduce as much as possible the total amount of solvent to be added.

The thickness of the (crosslinked) relief-forming layer in the relief printing starting plate for laser engraving is preferably 0.05 to 10 mm before and after crosslinking, more preferably 0.05 to 7 mm, and yet more preferably 0.05 to 3 mm.

<Crosslinking Step>

The process for producing a relief printing starting plate for laser engraving of the present invention is preferably a production process comprising a crosslinking step of crosslinking the relief-forming layer by means of heat and/or light to thus obtain a relief printing starting plate having a crosslinked relief-forming layer.

The relief-forming layer may be crosslinked by heating the relief printing starting plate for laser engraving (step of crosslinking by means of heat). As heating means for carrying out crosslinking by heat, there can be cited a method in which a printing starting plate is heated in a hot air oven or a farinfrared oven for a predetermined period of time and a method in which it is put into contact with a heated roller for a predetermined period of time.

Due to the relief-forming layer being thermally crosslinked, firstly, a relief formed after laser engraving becomes sharp and, secondly, tackiness of engraving residue formed when laser engraving is suppressed.

Relief Printing Plate and Process for Making Same

The process for making a relief printing plate of the present invention comprises a layer formation step of forming a relief-forming layer from the resin composition for laser engraving of the present invention, a crosslinking step of crosslinking the relief-forming layer by means of heat and/or light to thus obtain a relief printing starting plate having a crosslinked relief-forming layer, and an engraving step of laser-engraving the relief printing starting plater having the crosslinked relief-forming layer.

The relief printing plate of the present invention is a relief printing plate having a relief layer obtained by crosslinking and laser-engraving a layer formed from the resin composition for laser engraving of the present invention, and is preferably a relief printing plate made by the process for making a relief printing plate of the present invention.

The relief printing plate of the present invention may suitably employ an aqueous ink when printing.

The layer formation step and the crosslinking step in the process for making a relief printing plate of the present invention mean the same as the layer formation step and the crosslinking step in the above-mentioned process for producing a relief printing starting plate for laser engraving, and preferred ranges are also the same.

<Engraving Step>

The process for producing a relief printing plate of the present invention preferably comprises an engraving step of laser-engraving the relief printing starting plate having a crosslinked relief-forming layer.

The engraving step is a step of laser-engraving a crosslinked relief-forming layer that has been crosslinked in the crosslinking step to thus form a relief layer. Specifically, it is preferable to engrave a crosslinked relief-forming layer that has been crosslinked by irradiation with laser light according to a desired image, thus forming a relief layer. Furthermore, a step in which a crosslinked relief-forming layer is subjected to scanning irradiation by controlling a laser head using a computer in accordance with digital data of a desired image can preferably be cited.

This engraving step preferably employs an infrared laser. When irradiated with an infrared laser, molecules in the crosslinked relief-forming layer undergo molecular vibration, thus generating heat. When a high power laser such as a carbon dioxide laser or a YAG laser is used as the infrared laser, a large quantity of heat is generated in the laser-irradiated area, and molecules in the crosslinked relief-forming layer undergo molecular scission or ionization, thus being selectively removed, that is, engraved. The advantage of laser engraving is that, since the depth of engraving can be set freely, it is possible to control the structure three-dimensionally. For example, for an area where fine halftone dots are printed, carrying out engraving shallowly or with a shoulder prevents the relief from collapsing due to printing pressure, and for a groove area where a fine outline character is printed, carrying out engraving deeply makes it difficult for ink the groove to be blocked with ink, thus enabling breakup of an outline character to be suppressed.

In particular, when engraving is carried out using an infrared laser that corresponds to the absorption wavelength of the photothermal conversion agent, it becomes possible to selectively remove the crosslinked relief-forming layer at higher sensitivity, thus giving a relief layer having a sharp image.

As the infrared laser used in the engraving step, from the viewpoint of productivity, cost, etc., a carbon dioxide laser or a semiconductor laser is preferable. In particular, a fiber-coupled semiconductor infrared laser is preferably used. In general, compared with a CO2 laser, a semiconductor laser has higher efficiency laser oscillation, is less expensive, and can be made smaller. Furthermore, it is easy to form an array due to the small size. Moreover, the shape of the beam can be controlled by treatment of the fiber.

With regard to the semiconductor laser, one having a wavelength of 700 to 1,300 nm is preferable, one having a wavelength of 800 to 1,200 nm is more preferable, one having a wavelength of 860 to 1,200 nm is further preferable, and one having a wavelength of 900 to 1,100 nm is particularly preferable.

Furthermore, the fiber-coupled semiconductor laser can output laser light efficiently by being equipped with optical fiber, and this is effective in the engraving step in the present invention. Moreover, the shape of the beam can be controlled by treatment of the fiber. For example, the beam profile may be a top hat shape, and energy can be applied stably to the plate face. Details of semiconductor lasers are described in 'Laser Handbook $2^{nd}$ Edition' The Laser Society of Japan, Applied Laser Technology, The Institute of Electronics and Communication Engineers, etc.

Moreover, as plate making equipment comprising a fiber-coupled semiconductor laser that can be used suitably in the process for making a relief printing plate employing the relief printing starting plate of the present invention, those described in detail in JP-A-2009-172658 and JP-A-2009-214334 can be cited.

The process for making a relief printing plate of the present invention may as necessary further comprise, subsequent to the engraving step, a rinsing step, a drying step, and/or a post-crosslinking step, which are shown below.

Rinsing step: a step of rinsing the engraved surface by rinsing the engraved relief layer surface with water or a liquid containing water as a main component.

Drying step: a step of drying the engraved relief layer.

Post-crosslinking step: a step of further crosslinking the relief layer by applying energy to the engraved relief layer.

After the above-mentioned step, since engraving residue is attached to the engraved surface, a rinsing step of washing off engraving residue by rinsing the engraved surface with water or a liquid containing water as a main component may be added. Examples of rinsing means include a method in which washing is carried out with tap water, a method in which high pressure water is spray-jetted, and a method in which the engraved surface is brushed in the presence of mainly water using a batch or conveyor brush type washout machine known as a photosensitive resin letterpress plate processor, and when slime due to engraving residue cannot be eliminated, a rinsing liquid to which a soap or a surfactant is added may be used.

When the rinsing step of rinsing the engraved surface is carried out, it is preferable to add a drying step of drying an engraved relief-forming layer so as to evaporate rinsing liquid.

Furthermore, as necessary, a post-crosslinking step for further crosslinking the relief-forming layer may be added. By carrying out a post-crosslinking step, which is an additional crosslinking step, it is possible to further strengthen the relief formed by engraving.

The pH of the rinsing liquid that can be used in the present invention is preferably at least 9, more preferably at least 10, and yet more preferably at least 11. The pH of the rinsing liquid is preferably no greater than 14, more preferably no greater than 13.5, yet more preferably no greater than 13.2, particularly preferably no greater than 13.0, and most preferably no greater than 12.5. When in the above-mentioned range, handling is easy.

In order to set the pH of the rinsing liquid in the above-mentioned range, the pH may be adjusted using an acid and/or a base as appropriate, and the acid or base used is not particularly limited.

The rinsing liquid that can be used in the present invention preferably comprises water as a main component.

The rinsing liquid may contain as a solvent other than water a water-miscible solvent such as an alcohol, acetone, or tetrahydrofuran.

The rinsing liquid preferably comprises a surfactant.

From the viewpoint of removability of engraving residue and little influence on a relief printing plate, preferred examples of the surfactant that can be used in the present invention include betaine compounds (amphoteric surfactants) such as a carboxybetaine compound, a sulfobetaine compound, a phosphobetaine compound, an amine oxide compound, and a phosphine oxide compound.

The betaine compound is preferably a compound represented by Formula (1) below and/or a compound represented by Formula (2) below.

(1)

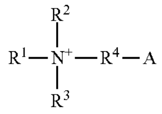

(In Formula (1), $R^1$ to $R^3$ independently denote a monovalent organic group, $R^4$ denotes a single bond or a divalent linking group, A denotes $PO(OR^5)O^-$, $OPO(OR^5)O^-$, $O^-$, $COO^-$, or $SO_3^-$, $R^5$ denotes a hydrogen atom or a monovalent organic group, and two or more groups of $R^1$ to $R^3$ may be bonded to each other to form a ring.)

(2)

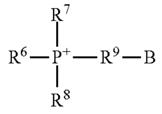

(In Formula (2), $R^6$ to $R^8$ independently denote a monovalent organic group, $R^9$ denotes a single bond or a divalent linking group, B denotes $PO(OR^{10})O^-$, $OPO(OR^{10})O^-$, $O^-$, $COO^-$, or $SO_3^-$, $R^5$ denotes a hydrogen atom or a monovalent organic group, and two or more groups of $R^6$ to $R^8$ may be bonded to each other to form a ring.)

The compound represented by Formula (1) above or the compound represented by Formula (2) above is preferably a carboxybetaine compound, a sulfobetaine compound, a phosphobetaine compound, an amine oxide compound, or a phosphine oxide compound. In the present invention, the structures of N═O of an amine oxide compound and P═O of a phosphine oxide compound are considered to be $N^+$—$O^-$ and $P^+$—$O^-$ respectively.

$R^1$ to $R^3$ in Formula (1) above independently denote a monovalent organic group. Two or more groups of $R^1$ to $R^3$ may be bonded to each other to form a ring, but it is preferable that no ring is formed.

The monovalent organic group denoted by $R^1$ to $R^3$ is not particularly limited, but is preferably an alkyl group, a hydroxy group-containing alkyl group, an alkyl group having an amide bond in an alkyl chain, or an alkyl group having an ether bond in an alkyl chain, and is more preferably an alkyl group, a hydroxy group-containing alkyl group, or an alkyl group having an amide bond in an alkyl chain.

Furthermore, the alkyl group as the monovalent organic group may have a straight chain, branched, or cyclic structure.

Moreover, it is particularly preferable that two of $R^1$ to $R^3$ are methyl groups, that is, a compound represented by Formula (1) has an N,N-dimethyl structure. When it has the above-mentioned structure, particularly good rinsing properties are exhibited.

$R^4$ in Formula (1) above denotes a single bond or a divalent linking group, and is a single bond when a compound represented by Formula (1) is an amine oxide compound.

The divalent linking group denoted by $R^4$ is not particularly limited, and is preferably an alkylene group or a hydroxy group-containing alkylene group, more preferably an alkylene group having 1 to 8 carbon atoms or a hydroxy group-containing alkylene group having 1 to 8 carbon atoms, and yet more preferably an alkylene group having 1 to 3 carbon atoms or a hydroxy group-containing-alkylene group having 1 to 3 carbon atoms.

A in Formula (1) above denotes $PO(OR^5)O^-$, $OPO(OR^5)O^-$, $O^-$, $COO^-$, or $SO_3^-$, and is preferably $O^-$, $COO^-$, or $SO_3^-$, and more preferably $COO^-$.

When A is $O^-$, $R^4$ is preferably a single bond.

$R^5$ in $PO(OR^5)O^-$ and $OPO(OR^5)O^-$ denotes a hydrogen atom or a monovalent organic group, and is preferably a hydrogen atom or an alkyl group having one or more unsaturated fatty acid ester structures.

Furthermore, $R^4$ is preferably a group that does not have $PO(OR^5)O^-$, $OPO(OR^5)O^-$, $O^-$, $COO^-$, or $SO_3^-$.

$R^6$ to $R^8$ in Formula (2) above independently denote a monovalent organic group. Two or more groups of $R^6$ to $R^8$ may be bonded to each other to form a ring, but it is preferable that no ring is formed.

The monovalent organic group denoted by $R^6$ to $R^8$ is not particularly limited, but is preferably an alkyl group, an alkenyl group, an aryl group, or a hydroxy group, and more preferably an alkenyl group, an aryl group, or a hydroxy group.

Furthermore, the alkyl group as the monovalent organic group may have a straight chain, branched, or cyclic structure.

It is particularly preferable that two of $R^6$ to $R^8$ are aryl groups.

$R^9$ in Formula (2) above denotes a single bond or a divalent linking group, and is a single bond when a compound represented by Formula (2) is a phosphine oxide compound.

The divalent linking group denoted by $R^9$ is not particularly limited, but is preferably an alkylene group or a hydroxy group-containing alkylene group, more preferably an alkylene group having 1 to 8 carbon atoms or a hydroxy group-containing alkylene group having 1 to 8 carbon atoms, and yet more preferably an alkylene group having 1 to 3 carbon atoms or a hydroxy group-containing alkylene group having 1 to 3 carbon atoms.

B in Formula (2) above denotes $PO(OR^{10})O^-$, $OPO(OR^{10})O^-$, $O^-$, $COO^-$, or $SO_3^-$, and is preferably $O^-$.

When B is $O^-$, $R^9$ is preferably a single bond.

$R^{10}$ in $PO(OR^{10})O^-$ and $OPO(OR^{10})O^-$ denotes a hydrogen atom or a monovalent organic group, and is preferably a hydrogen atom or an alkyl group having one or more unsaturated fatty acid ester structures.

Furthermore, $R^9$ is preferably a group that does not have $PO(OR^{10})O^-$, $OPO(OR^{10})O^-$, $O^-$, $COO^-$, or $SO_3^-$.

A compound represented by Formula (1) is preferably a compound represented by Formula (3) below.

(3)

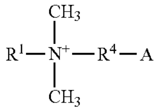

(In Formula (3), $R^1$ denotes a monovalent organic group, $R^4$ denotes a single bond or a divalent linking group, A denotes $PO(OR^5)O^-$, $OPO(OR^5)O^-$, $O^-$, $COO^-$, or $SO_3^-$, and $R^5$ denotes a hydrogen atom or a monovalent organic group.)

$R^1$, A, and $R^5$ in Formula (3) have the same meanings as $R^1$, A, and $R^5$ in Formula (1) above, and preferred ranges are also the same.

A compound represented by Formula (2) is preferably a compound represented by Formula (4) below.

(4)

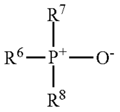

(In Formula (4), $R^6$ to $R^8$ independently denote an alkyl group, an alkenyl group, an aryl group, or a hydroxy group. In addition, not all of $R^6$ to $R^8$ are the same groups.)

$R^6$ to $R^8$ in Formula (4) above independently denote an alkyl group, an alkenyl group, an aryl group, or a hydroxy group, and are preferably an alkenyl group, an aryl group, or a hydroxy group.

Specific examples of the compound represented by Formula (1) and the compound represented by Formula (2) include the compounds below.

(1-A)

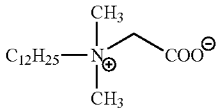

(1-B)

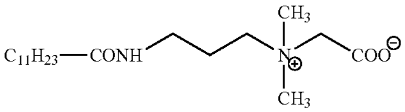

(1-C)

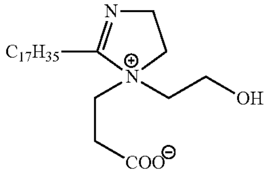

(1-D)

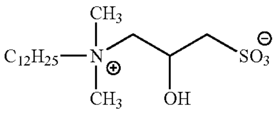

(1-E)

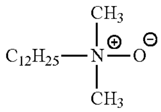

(1-F)

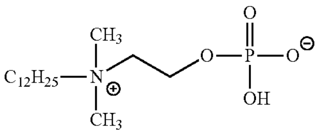

(1-G)

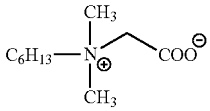

(1-H)

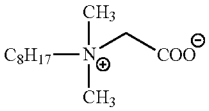

(1-I)

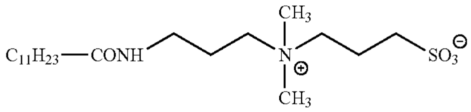

(1-J)

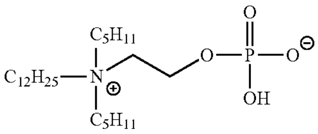

(1-K)

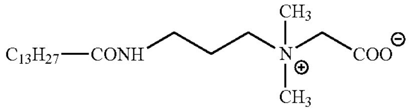

(1-L)

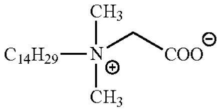

(1-M)

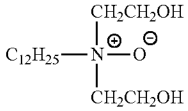

(1-N)

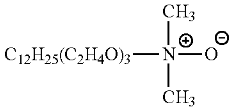

(1-O)

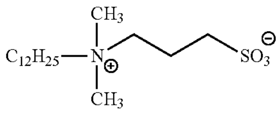

-continued (1-P)

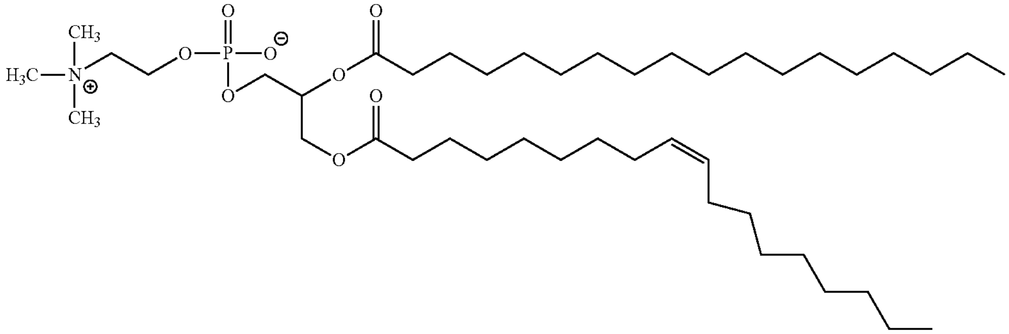

(1-Q)

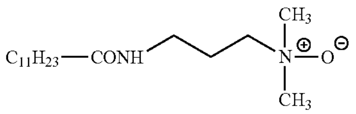

(2-A)

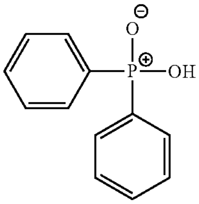

(2-B)

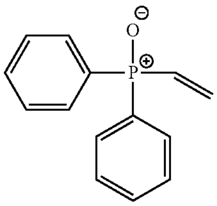

Furthermore, examples of the surfactant also include known anionic surfactants, cationic surfactants, amphoteric surfactants, and nonionic surfactants. Moreover, a fluorine-based or silicone-based nonionic surfactant may also be used in the same manner.

With regard to the surfactant, one type may be used on its own or two or more types may be used in combination.

It is not necessary to particularly limit the amount of surfactant used, but it is preferably 0.01 to 20 mass % relative to the total mass of the rinsing liquid, and more preferably 0.05 to 10 mass %.

The relief printing plate of the present invention having a relief layer may be produced as described above.

From the viewpoint of satisfying suitability for various aspects of flexographic printing, such as abrasion resistance and ink transfer properties, the thickness of the relief layer of the relief printing plate is preferably at least 0.05 mm but no greater than 10 mm, more preferably at least 0.05 mm but no greater than 7 mm, and yet more preferably at least 0.05 mm but no greater than 0.3 mm.

Furthermore, the Shore A hardness of the relief layer of the relief printing plate is preferably at least 50° but no greater than 90°. When the Shore A hardness of the relief layer is at least 50°, even if fine halftone dots formed by engraving receive a strong printing pressure from a letterpress printer, they do not collapse and close up, and normal printing can be carried out. Furthermore, when the Shore A hardness of the relief layer is no greater than 90°, even for flexographic printing with kiss touch printing pressure it is possible to prevent patchy printing in a solid printed part.

The Shore A hardness in the present specification is a value measured by a durometer (a spring type rubber hardness meter) that presses an indenter (called a pressing needle or indenter) into the surface of a measurement target at 25° C. so as to deform it, measures the amount of deformation (indentation depth), and converts it into a numerical value.

The relief printing plate of the present invention is particularly suitable for printing by a flexographic printer using an aqueous ink, but printing is also possible when it is carried out by a letterpress printer using any of aqueous, oil-based, and UV inks, and printing is also possible when it is carried out by a flexographic printer using a UV ink. The relief printing plate of the present invention has excellent rinsing properties, there is no engraving residue, since a relief layer obtained has excellent elasticity aqueous ink transfer properties and printing durability are excellent, and printing can be carried out for a long period of time without plastic deformation of the relief layer or degradation of printing durability.

EXAMPLES

The present invention is explained below further in detail by reference to Examples. The weight-average molecular weight (Mw) of polymers in the Examples is expressed as a value measured by a gel permeation chromatography (GPC) method unless otherwise specified. Furthermore, 'parts' denotes 'parts by mass' and '%' denotes 'mass %' unless otherwise specified.

The structural formula or compound name of Component A to Component F used in the Examples and Comparative Examples is shown below.

(Component A) Compound having Hydrolyzable Silyl Group and/or Silanol Group

In the structural formulae below, Et and Me denote an ethyl group and a methyl group respectively.

A-1
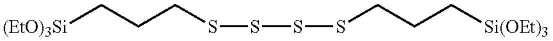
A-2
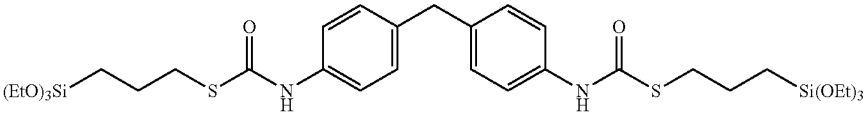
A-3
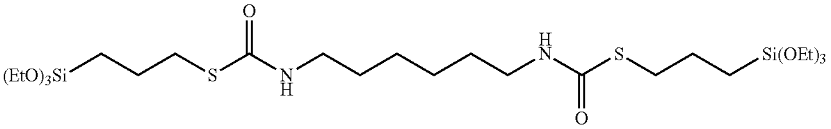
A-4
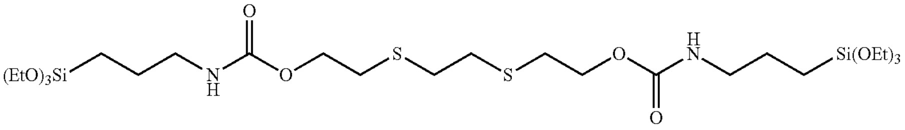
A-5
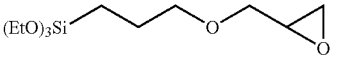
A-6
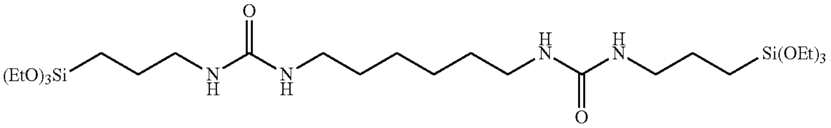
A-7
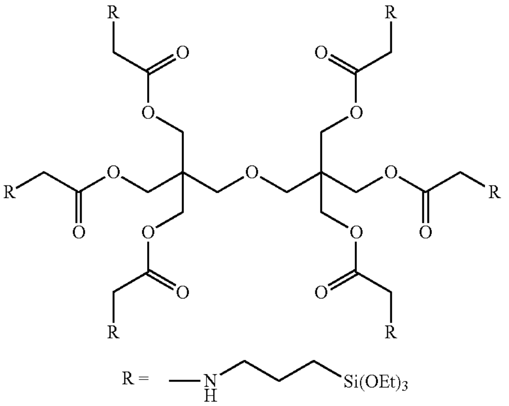
A-8
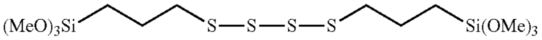
A-9
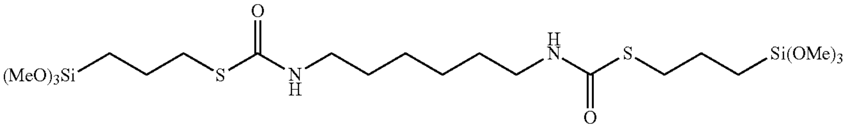
A-10
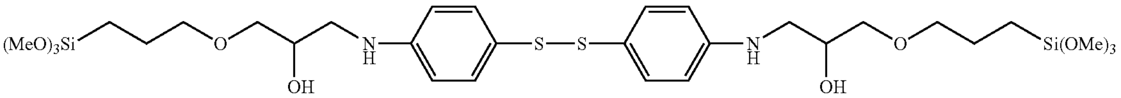
A-11
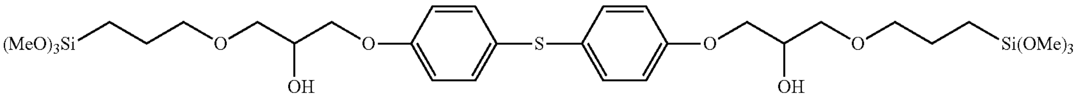
A-12
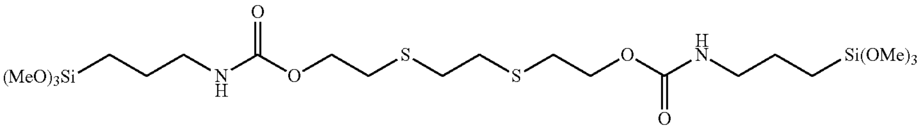

-continued
A-13
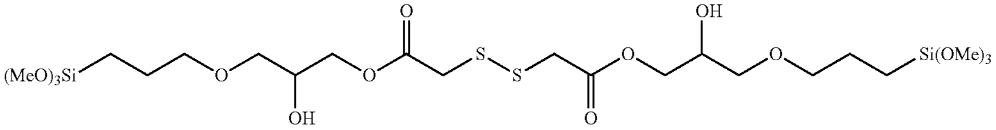
A-14
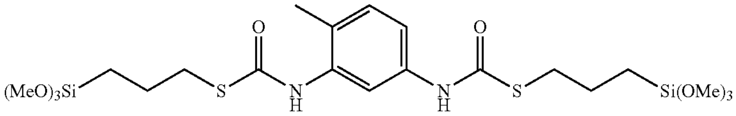
A-15
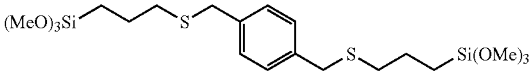
A-16
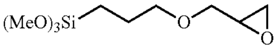
A-17
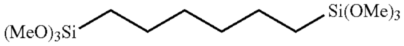
A-18
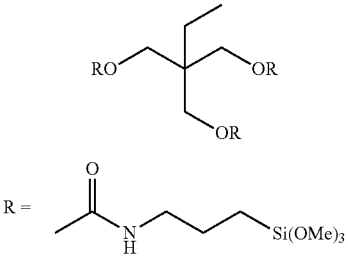
A-19
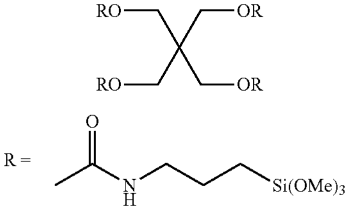
A-20
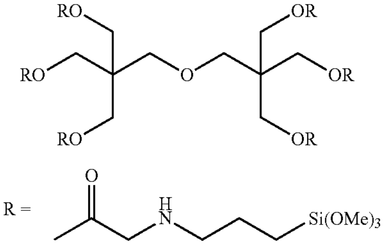
A-21
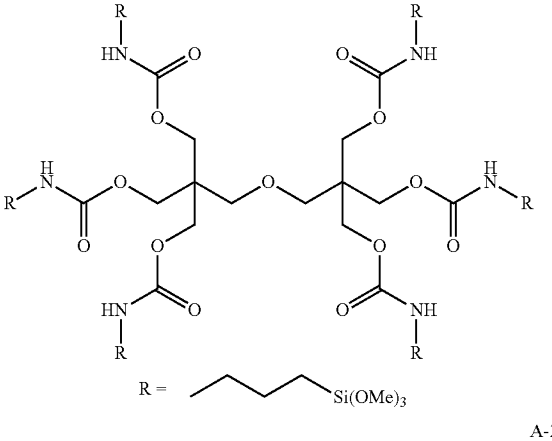
A-22
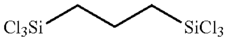
A-23
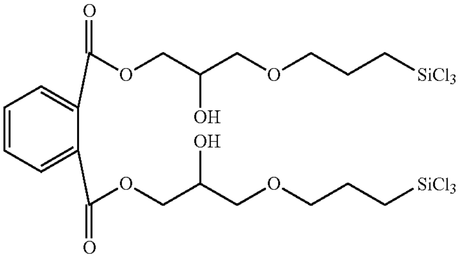
A-24
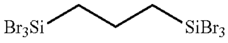
A-25
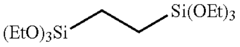

-continued

A-26

A mixture of 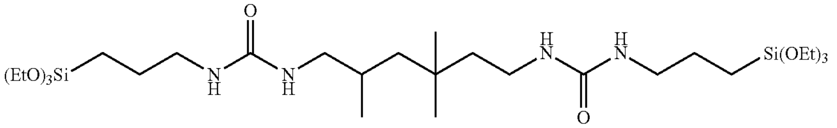 and

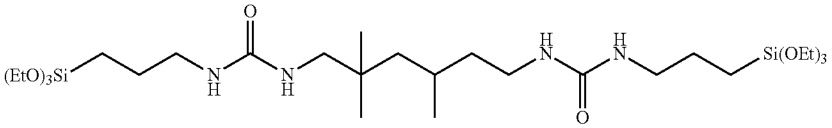

A-27

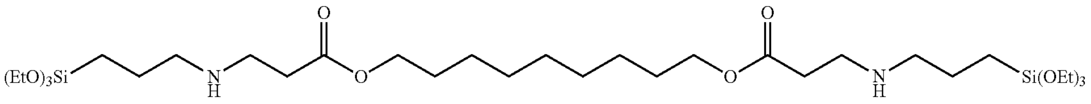

A-28

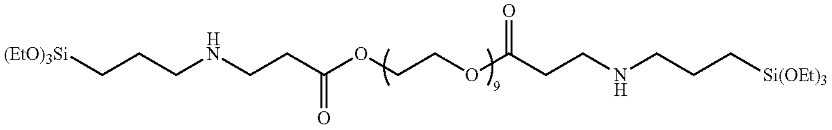

A-29

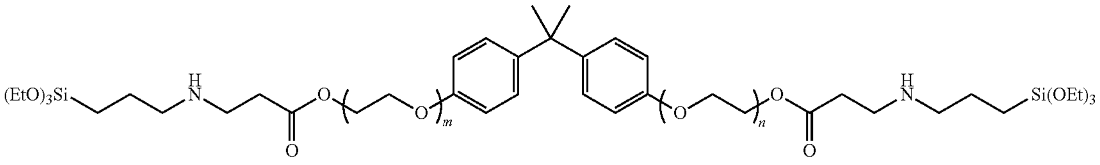

m + n = 4

A-30

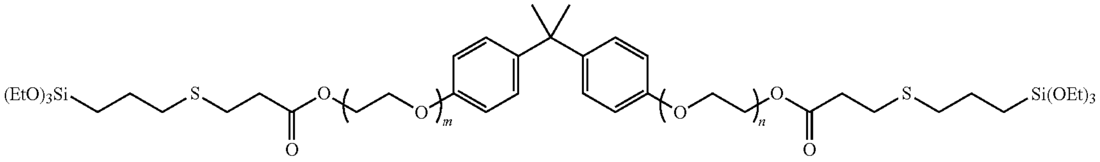

m + n = 4

A-31

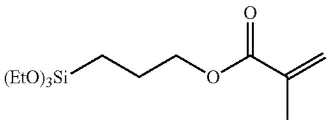

(Component B) Thermoplastic Elastomer

B-1: styrene-isoprene-styrene block copolymer (Kraton D1107J, Kraton Polymers)

B-2: styrene-butadiene-styrene block copolymer (Kraton D1102B, Kraton Polymers)

B-3: styrene-ethylene/butylene-styrene block copolymer (Kraton A1535, Kraton Polymers)

B-4: copolymer of ethylene/n-butyl acrylate/carbon monoxide (Elvaloy HP441, DuPont)

B-5: polyester (Hytrel 3046, DuPont-Toray Co., Ltd.)

B-6: olefin-based thermoplastic elastomer (Thermorun Z101 N, Mitsubishi Chemical Corporation)

B-7: polyimide elastomer (UBESTA XPA 9044X2, Ube Industries, Ltd.)

(Component C) Polymerizable Compound

C-1

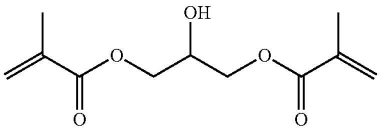

C-2

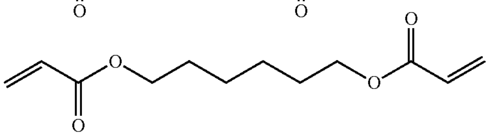

(Component D) Alcohol Exchange Reaction Catalyst

D-1: 1,8-diazabicyclo[5.4.0]undec-7-ene (DBU) (Wako Pure Chemical Industries, Ltd.)

D-2: Epomin SP-006 (polymer formed by polymerization of ethyleneimine, Nippon Shokubai Co., Ltd.)

D-3: phosphoric acid (Wako Pure Chemical Industries, Ltd.)

(Component E) Polymerization Initiator and (Component F) Photothermal Conversion Agent E-1: t-butyl peroxybenzoate (Perbutyl Z, NOF Corporation)

F-1: carbon black (Ketjen Black EC600JD, Lion Corporation)

Example 1

1. Preparation of Resin Composition for Laser Engraving

A three-necked flask equipped with a stirring blade and a condenser was charged with 50 parts of B-1 (Kraton D1107J, styrene-isoprene-styrene block copolymer, Kraton Polymers) as a thermoplastic elastomer (Component B) and 47 parts of toluene as a solvent, and heated at 70° C. for 120 minutes while stirring to thus dissolve the polymer. Subsequently, the solution was set at 40° C., 15 parts of monomer (C-1) as a polymerizable compound (Component C), 1.6 parts of Perbutyl Z (NOF Corporation) (E-1) as a polymerization initiator (Component E), and 1 part of Ketjen Black EC600JD (carbon black, Lion Corporation) (F-1) as a photothermal conversion agent (Component F) were further added, and stirring was carried out for 30 minutes. Subsequently, 15 parts of KBE-846 (Shin-Etsu Chemical Co., Ltd.) (A-1) as (Component A) and 0.4 parts of DBU (Wako Pure Chemical Industries, Ltd.) (D-1) as an alcohol exchange reaction catalyst were added, and stirring was carried out at 40° C. for 10 minutes. As a result of the above operations, flowable resin composition 1 for laser engraving was obtained.

2. Preparation of Relief Printing Starting Plate for Laser Engraving

A spacer (frame) having a predetermined thickness was placed on a PET substrate, and resin composition 1 for laser engraving was cast gently so that it did not overflow from the spacer (frame) and dried in an oven at 70° C. for 3 hours to provide a relief-forming layer having a thickness of about 1 mm, thus preparing relief printing starting plate 1 for laser engraving.

3. Making Relief Printing Plate

The relief-forming layer of the starting plate obtained was heated at 80° C. for 3 hours and further at 100° C. for 3 hours, thus thermally crosslinking the relief-forming layer.

The crosslinked relief-forming layer was engraved using the two types of laser below.

Engraving by CO2 Laser

As a carbon dioxide laser ($CO_2$ laser) engraving machine, an ML-9100 series high quality $CO_2$ laser marker (Keyence) was used. After a protection film was peeled off from the printing starting plate 1 for laser engraving, a 1 cm square solid printed part was raster-engraved using the carbon dioxide laser engraving machine under conditions of an output of 12 W, a head speed of 200 mm/sec, and a pitch setting of 2,400 DPI.

Engraving by FC-LD

As a semiconductor laser engraving machine, laser recording equipment provided with an SDL-6390 fiber-coupled semiconductor laser (FC-LD) (JDSU, wavelength 915 nm) with a maximum power of 8.0 W was used. A 1 cm square solid printed part was raster-engraved using the semiconductor laser engraving machine under conditions of a laser output of 7.5 W, a head speed of 409 mm/sec, and a pitch setting of 2,400 DPI.

The thickness of the relief layer of the relief printing plate was 1.1 mm.

Furthermore, when the Shore A hardness of the relief layer was measured by the above-mentioned measurement method, it was found to be 75°. Measurement of Shore A hardness was carried out in the same manner for the Examples and Comparative Examples described below.

4. Evaluation of Relief Printing Plate

Evaluation of relief printing plate performance was carried out for the items below, and the results are given in Table 1.

Engraving Depth

The 'engraving depth' of a relief layer obtained by laser engraving was measured as follows. The 'engraving depth' referred to here means the difference between an engraved position (height) and an unengraved position (height) when a cross-section of the relief layer was examined. The 'engraving depth' in the present Examples was measured by examining a cross-section of a relief layer using a VK9510 ultradepth color 3D profile measurement microscope (Keyence). A large engraving depth means a high engraving sensitivity. The results are given in Table 1 for each of the types of laser used for engraving (carbon dioxide laser ($CO_2$ laser), fiber-coupled semiconductor laser (FC-LD)).

Rinsing Properties

A rinsing liquid was prepared by mixing water, a 10 wt % aqueous solution of sodium hydroxide, and betaine compound (1-B) below so that the pH was 12 and the content of betaine compound (1-B) was 1 mass % of the total rinsing liquid.

The rinsing liquid thus prepared was dropped (about 100 mL/$m^2$) by means of a pipette onto a plate material engraved by the above-mentioned method so that the plate surface became uniformly wet, was allowed to stand for 1 min, and rubbed using a toothbrush (Clinica Toothbrush Flat, Lion Corporation) 20 times (30 sec) in parallel to the plate with a load of 200 gf. Subsequently, the plate face was washed with running water, moisture of the plate face was removed, and it was naturally dried for approximately 1 hour.

(1-B)

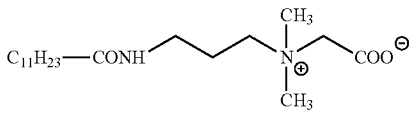

Unremoved residue on the plate was evaluated by examining the rinsed plate surface using a 100× magnification microscope (Keyence). Evaluation criteria were as follows.

1: residue adhering to the entire plate face.

2: slight residue remaining on convex parts of plate image, and residue remaining in bottom parts of image (concave parts).

3: slight residue remaining on convex parts of plate image, and slight residue remaining in bottom parts of image (concave parts).

4: slight residue remaining only in bottom parts of image (concave parts).

5: no residue at all remaining on plate.

Film Elasticity

Measured using a microhardness tester (GS-706, TECLOCK Corporation). A pressing load of 300 mN was released after 10 sec, and the percentage plastic deformation between that before and that after pressing was measured.

Printing Durability

A relief printing plate that had been obtained was set in a printer (model ITM-4, Iyo Kikai Seisakujo Co., Ltd.), printing was continued using the aqueous ink Aqua SPZ16 Rouge (Toyo Ink Mfg. Co., Ltd.) as an ink without dilution and Full Color Form M 70 (Nippon Paper Industries Co., Ltd., thickness 100 μm) as printing paper, and 1% to 10% highlights were checked for the printed material. Completion of printing was defined as being when a halftone dot was not printed, and the length (meters) of paper printed up to the completion of printing was used as an index. The larger the value, the better the evaluation of printing durability.

Ink Transfer Properties

In the above-mentioned evaluation of printing durability, the degree of ink attachment of a solid printed part on the printed material at 500 m and 1,000 m after starting printing was visually compared.

One that was uniform without unevenness in density was evaluated as Good, one with unevenness was evaluated as Poor, and a degree midway between Good and Poor was evaluated as Fair.

Shore A Hardness

Shore A hardness was measured by a durometer (a spring type rubber hardness meter) that presses an indenter into the surface of a measurement target at 25° C. so as to deform it, measures the amount of deformation (indentation depth), and converts it into a numerical value.

Examples 2 to 49 and Comparative Examples 1 to 3

Coating solutions for a crosslinkable relief-forming layer (resin composition for laser engraving) were prepared in the same manner as in Example 1 except that Component A to Component F used in Example 1 were changed to those shown in Table 1, and evaluation was carried out in the same manner as in Example 1. In Example 48, the amount of Component A added was 5 parts. In Example 49, rinsing properties were evaluated without adding the betaine compound (1-B).

The relief printing plates of the Examples prepared using resin compositions for laser engraving comprising Component A to Component C shown in Table 1 had excellent rinsing properties and high productivity during plate making compared with the relief printing plates of the Comparative Examples. Furthermore, the elasticity of the relief layer, ink transfer properties, and printing durability were good, and excellent printing performance could be exhibited for a long period of time; moreover, since the engraving depth was large, the engraving sensitivity was good.

In addition, a Component A having an ester bond, a urethane bond, and/or an ether bond in the molecule had good rinsing properties, and one having an oxyalkylene group was particularly good.

It can also be seen that, when the same relief printing starting plates were used, engraving depth could be further improved by the use of plate making equipment employing an FC-LD as a light source.

TABLE 1

| | Composition | | | | | | Layer | Evaluation results | | | | | | |
|---|---|---|---|---|---|---|---|---|---|---|---|---|---|---|
| | | | | | | | | Engraving depth (μm) | | | Film elasti- | Printing dura- | Ink | Shore A |
| | Comp. A | Comp. B | Comp. C | Comp. D | Comp. E | Comp. F | thickness (mm) | FC-LD | $CO_2$ laser | Rinsing properties | city (%) | bility (m) | transfer properties | hardness (°) |
| Ex. 1 | A-1 | B-1 | C-1 | D-1 | E-1 | F-1 | 1.1 | 410 | 328 | 5 | 8 | 1800 | Good | 70 |
| Ex. 2 | A-2 | B-1 | C-1 | D-1 | E-1 | F-1 | 1.0 | 405 | 324 | 5 | 7 | 1800 | Good | 70 |
| Ex. 3 | A-3 | B-1 | C-1 | D-1 | E-1 | F-1 | 1.2 | 405 | 324 | 5 | 9 | 1900 | Good | 60 |
| Ex. 4 | A-4 | B-1 | C-1 | D-1 | E-1 | F-1 | 1.0 | 410 | 328 | 5 | 8 | 1800 | Good | 65 |
| Ex. 5 | A-5 | B-1 | C-1 | D-1 | E-1 | F-1 | 1.1 | 370 | 296 | 5 | 9 | 1800 | Good | 65 |
| Ex. 6 | A-6 | B-1 | C-1 | D-1 | E-1 | F-1 | 1.1 | 360 | 288 | 5 | 9 | 1900 | Good | 70 |
| Ex. 7 | A-7 | B-1 | C-1 | D-1 | E-1 | F-1 | 1.2 | 400 | 320 | 5 | 8 | 1800 | Good | 65 |
| Ex. 8 | A-8 | B-1 | C-1 | D-1 | E-1 | F-1 | 1.2 | 400 | 320 | 5 | 5 | 2000 | Good | 70 |
| Ex. 9 | A-9 | B-1 | C-1 | D-1 | E-1 | F-1 | 1.1 | 405 | 324 | 5 | 5 | 2100 | Good | 65 |
| Ex. 10 | A-10 | B-1 | C-1 | D-1 | E-1 | F-1 | 1.1 | 395 | 316 | 5 | 6 | 2000 | Good | 65 |
| Ex. 11 | A-11 | B-1 | C-1 | D-1 | E-1 | F-1 | 1.1 | 405 | 324 | 5 | 5 | 2000 | Good | 70 |
| Ex. 12 | A-12 | B-1 | C-1 | D-1 | E-1 | F-1 | 1.0 | 395 | 316 | 5 | 5 | 2000 | Good | 65 |
| Ex. 13 | A-13 | B-1 | C-1 | D-1 | E-1 | F-1 | 0.9 | 405 | 324 | 5 | 5 | 2000 | Good | 75 |
| Ex. 14 | A-14 | B-1 | C-1 | D-1 | E-1 | F-1 | 1.2 | 400 | 320 | 5 | 6 | 2100 | Good | 60 |
| Ex. 15 | A-15 | B-1 | C-1 | D-1 | E-1 | F-1 | 1.0 | 400 | 320 | 5 | 5 | 2100 | Good | 65 |
| Ex. 16 | A-16 | B-1 | C-1 | D-1 | E-1 | F-1 | 1.0 | 360 | 288 | 5 | 8 | 2100 | Good | 70 |
| Ex. 17 | A-17 | B-1 | C-1 | D-1 | E-1 | F-1 | 1.2 | 360 | 288 | 5 | 5 | 2000 | Good | 65 |
| Ex. 18 | A-18 | B-1 | C-1 | D-1 | E-1 | F-1 | 0.9 | 360 | 288 | 5 | 5 | 2000 | Good | 70 |
| Ex. 19 | A-19 | B-1 | C-1 | D-1 | E-1 | F-1 | 1.1 | 365 | 292 | 5 | 4 | 2000 | Good | 65 |
| Ex. 20 | A-20 | B-1 | C-1 | D-1 | E-1 | F-1 | 1.2 | 350 | 280 | 5 | 5 | 2000 | Good | 70 |
| Ex. 21 | A-21 | B-1 | C-1 | D-1 | E-1 | F-1 | 1.0 | 350 | 280 | 5 | 5 | 2000 | Good | 65 |
| Ex. 22 | A-22 | B-1 | C-1 | D-1 | E-1 | F-1 | 1.0 | 360 | 288 | 4 | 10 | 1600 | Good | 65 |
| Ex. 23 | A-23 | B-1 | C-1 | D-1 | E-1 | F-1 | 1.0 | 340 | 272 | 4 | 10 | 1600 | Good | 70 |
| Ex. 24 | A-24 | B-1 | C-1 | D-1 | E-1 | F-1 | 1.1 | 340 | 272 | 4 | 10 | 1500 | Good | 65 |
| Ex. 25 | A-25 | B-1 | C-1 | D-1 | E-1 | F-1 | 1.1 | 405 | 324 | 5 | 4 | 2150 | Good | 70 |
| Ex. 26 | A-26 | B-1 | C-1 | D-1 | E-1 | F-1 | 1.2 | 405 | 324 | 5 | 4 | 2200 | Good | 65 |
| Ex. 27 | A-27 | B-1 | C-1 | D-1 | E-1 | F-1 | 1.0 | 405 | 324 | 5 | 4 | 2050 | Good | 70 |
| Ex. 28 | A-28 | B-1 | C-1 | D-1 | E-1 | F-1 | 1.0 | 410 | 328 | 5 | 4 | 2100 | Good | 65 |
| Ex. 29 | A-29 | B-1 | C-1 | D-1 | E-1 | F-1 | 1.0 | 405 | 324 | 5 | 4 | 2200 | Good | 60 |
| Ex. 30 | A-30 | B-1 | C-1 | D-1 | E-1 | F-1 | 1.2 | 415 | 332 | 5 | 4 | 2250 | Good | 65 |
| Ex. 31 | A-31 | B-1 | C-1 | D-1 | E-1 | F-1 | 1.1 | 330 | 264 | 5 | 5 | 2300 | Good | 70 |
| Ex. 32 | A-1 | B-2 | C-1 | D-1 | E-1 | F-1 | 1.1 | 410 | 328 | 5 | 8 | 1900 | Good | 60 |
| Ex. 33 | A-1 | B-3 | C-1 | D-1 | E-1 | F-1 | 1.0 | 410 | 328 | 5 | 8 | 1900 | Good | 70 |
| Ex. 34 | A-1 | B-4 | C-1 | D-1 | E-1 | F-1 | 0.9 | 410 | 328 | 5 | 8 | 1800 | Good | 65 |
| Ex. 35 | A-1 | B-5 | C-1 | D-1 | E-1 | F-1 | 1.1 | 405 | 324 | 5 | 8 | 1700 | Good | 65 |

TABLE 1-continued

| | Composition | | | | | | Layer | Evaluation results: Engraving depth (μm) | | | | | | | |
|---|---|---|---|---|---|---|---|---|---|---|---|---|---|---|---|
| | Comp. A | Comp. B | Comp. C | Comp. D | Comp. E | Comp. F | thickness (mm) | FC-LD | $CO_2$ laser | Rinsing properties | Film elasticity (%) | Printing durability (m) | Ink transfer properties | Shore A hardness (°) |
| Ex. 36 | A-1 | B-6 | C-1 | D-1 | E-1 | F-1 | 1.0 | 405 | 324 | 5 | 8 | 1700 | Good | 70 |
| Ex. 37 | A-1 | B-7 | C-1 | D-1 | E-1 | F-1 | 1.1 | 405 | 324 | 5 | 8 | 1700 | Good | 65 |
| Ex. 38 | A-1 | B-1 | C-2 | D-1 | E-1 | F-1 | 1.0 | 415 | 332 | 5 | 8 | 1800 | Good | 70 |
| Ex. 39 | A-1 | B-1 | C-1 | D-2 | E-1 | F-1 | 1.0 | 410 | 328 | 5 | 8 | 1800 | Good | 70 |
| Ex. 40 | A-1 | B-1 | C-1 | D-3 | E-1 | F-1 | 1.1 | 410 | 328 | 5 | 8 | 1800 | Good | 65 |
| Ex. 41 | A-1 | B-1 | C-1 | None | E-1 | F-1 | 1.0 | 410 | 328 | 4 | 9 | 1700 | Good | 65 |
| Ex. 42 | A-1 | B-1 | C-1 | D-1 | None | F-1 | 1.2 | 415 | 332 | 5 | 10 | 1400 | Good | 55 |
| Ex. 43 | A-1 | B-1 | C-1 | D-1 | E-1 | None | 1.1 | 370 | 296 | 5 | 8 | 1800 | Good | 70 |
| Ex. 44 | A-1 | B-1 | C-1 | D-1 | None | None | 1.2 | 370 | 296 | 5 | 10 | 1400 | Good | 55 |
| Ex. 45 | A-1 | B-1 | C-1 | None | E-1 | None | 1.1 | 370 | 296 | 4 | 9 | 1700 | Good | 60 |
| Ex. 46 | A-1 | B-1 | C-1 | None | None | F-1 | 1.1 | 410 | 328 | 4 | 10 | 1400 | Good | 55 |
| Ex. 47 | A-1 | B-1 | C-1 | None | None | None | 1.0 | 370 | 296 | 4 | 10 | 1400 | Good | 55 |
| Ex. 48 | A-1 (5 parts) | B-1 | C-1 | D-1 | E-1 | F-1 | 1.1 | 410 | 328 | 4 | 9 | 1400 | Good | 60 |
| Ex. 49 | A-1 | B-1 | C-1 | D-1 | E-1 | F-1 | 1.1 | 410 | 328 | 4 (no surfactant) | 8 | 1800 | Good | 70 |
| Comp. Ex. 1 | None | B-1 | None | None | None | None | 1.0 | 380 | 304 | 1 | 15 | 500 | Good | 50 |
| Comp. Ex. 2 | None | B-1 | C-1 | None | E-1 | None | 1.1 | 360 | 288 | 1 | 9 | 1400 | Good | 60 |
| Comp. Ex. 3 | A-1 | B-1 | None | None | None | None | 1.1 | 370 | 296 | 4 | 10 | 1000 | Good | 55 |

What is claimed is:

1. A process for making a relief printing plate, comprising the steps of:

receiving a relief printing plate precursor having a crosslinked relief-forming layer obtained by thermally curing a layer formed from a resin composition comprising (Component A) a compound having at least one of a hydrolysable silyl group and a silanol group, (Component B) a thermoplastic elastomer, and (Component C) a polymerizable compound;

laser-engraving the crosslinked relief-forming layer of the relief printing plate precursor to form a relief layer having an engraved surface; and rinsing the engraved surface of the relief layer with a rinsing liquid comprising water as a main component, wherein the rinsing liquid has a pH of at least 9 but no greater than 13.4.

2. The process for making a relief printing plate according to claim 1, wherein Component A above is a compound having a total of two or more of a hydrolyzable silyl group and a silanol group.

3. The process for making a relief printing plate according to claim 1, wherein the hydrolyzable silyl group of Component A above is a residue in which at least one of an alkoxy group and a halogen atom is directly bonded to the Si atom.

4. The process for making a relief printing plate according to claim 1, wherein Component A above has only the hydrolysable silyl group, only the silanol group, or only the hydrolyzable silyl group and the silanol group, as a polymerizable group.

5. The process for making a relief printing plate according to claim 1, wherein Component B above is the thermoplastic elastomer selected from the group consisting of a styrene-based thermoplastic elastomer, an polyester-based thermoplastic elastomer, an polyamide-based thermoplastic elastomer, an olefin-based thermoplastic elastomer, and an ethylene-(meth)acrylate ester-based thermoplastic elastomer.

6. The process for making a relief printing plate according to Claim 5, wherein Component B above is the styrene-based thermoplastic elastomer or the ethylene-(meth)acrylate ester-based thermoplastic elastomer.

7. The process for making a relief printing plate according to claim 1, wherein the resin composition further comprises (Component D) an alcohol exchange reaction catalyst.

8. The process for making a relief printing plate according to claim 1, wherein the resin composition further comprises (Component E) a polymerization initiator.

9. The process for making a relief printing plate according to claim 1, wherein the resin composition further comprises (Component F) a photothermal conversion agent that can absorb light having a wavelength of 700 to 1,300 nm.

10. The process for making a relief printing plate according to claim 1, wherein the crosslinked relief-forming layer has a thickness of at least 0.05 mm but no greater than 10 mm.

11. The process for making a relief printing plate according to claim 1, wherein the crosslinked relief-forming layer has a Shore A hardness of at least 50° but no greater than 90°.

12. The process for making a relief printing plate according to claim 1, wherein the rinsing liquid has a pH of at least 11 but no greater than 13.2.

13. The process for making a relief printing plate according to claim 1, wherein the rinsing liquid comprises a surfactant.

14. The process for making a relief printing plate according to claim 13, wherein the rinsing liquid comprises an amphoteric surfactant.

15. The process for making a relief printing plate according to claim 12, wherein the rinsing liquid comprises a surfactant.

16. The process for making a relief printing plate according to claim 15, wherein the rinsing liquid comprises an amphoteric surfactant.

* * * * *